US007895269B2

(12) United States Patent
Ikeda

(10) Patent No.: US 7,895,269 B2
(45) Date of Patent: Feb. 22, 2011

(54) INFORMATION PROCESSING APPARATUS AND METHOD IN WHICH DATA RASTERIZED ON A PLURALITY OF MEMORIES IS TRANSMITTED TO CORRESPONDING EXTERNAL APPARATUSES

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1513 days.

(21) Appl. No.: 11/265,435

(22) Filed: Nov. 1, 2005

(65) Prior Publication Data

US 2006/0092466 A1 May 4, 2006

(30) Foreign Application Priority Data

Nov. 2, 2004 (JP) ............................. 2004-319495

(51) Int. Cl.
G06F 3/12 (2006.01)
(52) U.S. Cl. .................. 709/204; 709/208; 709/213; 382/276; 358/1.15
(58) Field of Classification Search ............ 709/204, 709/208, 213; 358/1.15; 382/276
See application file for complete search history.

(56) References Cited

U.S. PATENT DOCUMENTS

| 5,638,498 | A * | 6/1997 | Tyler et al. ................. 358/1.18 |
| 6,709,116 | B1 * | 3/2004 | Raskar et al. ............... 353/121 |
| 6,992,668 | B2 * | 1/2006 | Gosalia et al. .............. 345/419 |
| 7,072,052 | B1 * | 7/2006 | Tanahashi et al. ........... 358/1.1 |
| 7,336,851 | B1 * | 2/2008 | Cote .......................... 382/282 |
| 7,474,423 | B2 * | 1/2009 | Garcia et al. ............... 358/1.15 |
| 7,617,279 | B2 * | 11/2009 | Nakajima et al. ........... 709/204 |
| 2002/0015064 | A1 * | 2/2002 | Robotham et al. .......... 345/863 |
| 2002/0026463 | A1 * | 2/2002 | Utsunomiya ................. 707/527 |
| 2003/0052986 | A1 * | 3/2003 | Matsumoto ............. 348/333.05 |
| 2003/0110220 | A1 * | 6/2003 | Lapstun et al. .............. 709/204 |
| 2003/0191738 | A1 | 10/2003 | Hoeye et al. |
| 2003/0225832 | A1 * | 12/2003 | Ludwig ....................... 709/204 |
| 2004/0015551 | A1 * | 1/2004 | Thornton ..................... 709/204 |
| 2004/0105122 | A1 * | 6/2004 | Schaeffer .................... 358/1.15 |

(Continued)

FOREIGN PATENT DOCUMENTS

EP      1191450 A      3/2002

(Continued)

OTHER PUBLICATIONS

Han et al. "WebSplitter: A Unified XML Framework for Multi-Device Collaborative Web Browsing," IBM Thomas J. Watson Research Center, ACM 2000.*

(Continued)

Primary Examiner—Alina N. Boutah
(74) Attorney, Agent, or Firm—Cowan, Liebowitz & Latman, P.C.

(57) ABSTRACT

Use and selection of, e.g., a wireless video transmission apparatus cumbersome for a user are eliminated. When a new application is activated, a wireless video transmission apparatus 2 is selected as the transmission destination of image data. Image data rasterized on a VM1 is transferred to a temporary memory. Image data rasterized on a VM2 is transferred to the VM1. Image data of the new application is transferred to the VM2. The image data rasterized on the VM1 and VM2 are transmitted to the wireless video transmission apparatuses 1 and 2, respectively.

18 Claims, 23 Drawing Sheets

U.S. PATENT DOCUMENTS

| | | | |
|---|---|---|---|
| 2004/0117358 A1* | 6/2004 | von Kaenel et al. | 707/3 |
| 2004/0222983 A1 | 11/2004 | Kakemura | |
| 2004/0230651 A1* | 11/2004 | Ivashin | 709/204 |
| 2005/0086669 A1* | 4/2005 | Boyd et al. | 719/328 |
| 2005/0122539 A1* | 6/2005 | Sugimoto | 358/1.15 |
| 2006/0250410 A1* | 11/2006 | Qi et al. | 345/585 |

FOREIGN PATENT DOCUMENTS

| | | |
|---|---|---|
| EP | 1455267 A2 | 9/2004 |
| JP | 09-146750 A | 6/1997 |
| JP | 09-269886 A | 10/1997 |
| JP | 10-200960 A | 7/1998 |
| JP | 11-134163 A | 5/1999 |
| JP | 2003-330436 | 11/2003 |
| JP | 2004-054134 | 2/2004 |
| JP | 2004-054783 | 2/2004 |
| JP | 2004-264769 A | 9/2004 |

OTHER PUBLICATIONS

The above references were cited in a Feb. 23, 2010 European Search Report, which is not enclosed of the counterpart European Patent Application No. 05256761.7.

The above reference was cited in a Nov. 12, 2009 Partial European Search Report of the counterpart European Patent Application No. 05256761.7.

* cited by examiner

F I G. 18

| TRANSFER APPARATUS (1801) | COMMUNICATION SPEED (1802) | RESOLUTION (1803) |
|---|---|---|
| 1 | MEDIUM / LOW | MEDIUM |
| 2 | HIGH | HIGH |

F I G. 23

| ENTRY NO. | NAME | MAC ADDRESS |
|---|---|---|
| 1 | WIRELESS VIDEO TRANSFER APPARATUS 2 | 00 : 08 : 40 : DE : F9 : 90 |
| 2 | WIRELESS VIDEO TRANSFER APPARATUS 1 | 00 : 08 : 40 : CA : 49 : 92 |

2301　2302　2303

INFORMATION PROCESSING APPARATUS AND METHOD IN WHICH DATA RASTERIZED ON A PLURALITY OF MEMORIES IS TRANSMITTED TO CORRESPONDING EXTERNAL APPARATUSES

FIELD OF THE INVENTION

The present invention relates to an information processing apparatus which is connected to an external apparatus such as a wireless video transmission apparatus through a communication network and can transmit image data to the external apparatus, and an information processing method.

BACKGROUND OF THE INVENTION

In recent conferences or lectures, presentation is done not by printing presentation materials created by a personal computer (to be referred to as a PC hereinafter) but by enlarging and projecting the contents of the display screen of the PC by using, e.g. a video projector.

Generally, to enlarge and project the output video signal of a PC by a video projector, the PC and video projector must be connected by a cable to transmit the output video of the PC. However, if a video projector is shared by a plurality of PCs, it is cumbersome to connect the PCs and video projector by a cable in every setting. There is room for further improvement of usability. For this reason, wireless video transmission apparatuses for transmitting a video signal by wireless LAN without connecting a PC and a video projector by a cable are available on the market.

Such wireless video transmission apparatuses with the wireless LAN function include known apparatuses having a function of divisionally enlarging and projecting, on a projection screen, video signals on the display screens of a plurality of PCs or a function of transmitting the video signal on the display screen of a PC to a plurality of wireless video transmission apparatuses.

There is an infrastructure called a multimonitor which outputs a signal from one PC to a plurality of monitors. In the multi-monitor, a plurality of video cards are added to the PC, and two or more displays are displayed as if they were one large screen.

However, when one PC and a plurality of wireless video transmission apparatuses are wirelessly connected, the following problems are posed.

1. Since projection performance such as the resolution changes between the wireless video transmission apparatuses, it is cumbersome to select and use one wireless video transmission apparatus.

2. Since a plurality of wireless communication protocols are installed on the wireless video transmission apparatus side, it is cumbersome to select and use one wireless video transmission apparatus.

3. Since a plurality of video cards and hardware resources are necessary, the devices are expensive. For these reasons, the convenience to users is considerably poor in implementing multimonitor presentation using the conventional external apparatuses so no excellent usability is obtained.

It is an object of the present invention to save time and eliminate trouble for a user in selecting, as a data transmission destination, one of a plurality of external apparatuses such as wireless video transmission apparatuses.

SUMMARY OF THE INVENTION

According to the present invention, there is provided an information processing apparatus which is connected to a plurality of external apparatuses through a communication network, comprising an application controller which activates a plurality of applications, a plurality of memories which are provided in correspondence with the plurality of external apparatuses and on which data generated by the plurality of applications are rasterized, a transmitting unit which transmits the data rasterized on the plurality of memories to the corresponding external apparatuses, a temporary memory to temporarily save data rasterized on one of the plurality of memories, a selector which, when a new application different from the applications whose data are already rasterized on the plurality of memories is activated by the application controller, selects an external apparatus as a transmission destination of data generated by the new application from the plurality of external apparatuses, a first transferring unit which transfers, to the temporary memory, one of data rasterized on a first memory as one of the plurality of memories, which corresponds to the external apparatus selected by the selector, and data rasterized on a second memory as one of the plurality of memories, which is different from the first memory, a second transferring unit which transfers, to the second memory, the data rasterized on the first memory when the data rasterized on the second memory is transferred to the temporary memory, and a third transferring unit which transfers the data generated by the new application to the first memory.

According to the present invention, there is provided an information processing method by an information processing apparatus including a plurality of memories which are provided in correspondence with a plurality of external apparatuses and on which data of a plurality of applications are rasterized, and a temporary memory to temporarily save image data rasterized on one of the plurality of memories, and connected to the plurality of external apparatuses through a communication network, comprising a selection step of, when a new application different from the applications whose data are already rasterized on the plurality of memories is activated by an application controller, selecting an external apparatus as a transmission destination of data generated by the new application from the plurality of external apparatuses, a first transferring step of transferring, to the temporary memory, one of data rasterized on a first memory as one of the plurality of memories, which corresponds to the external apparatus selected in the selection step, and data rasterized on a second memory as one of the plurality of memories, which is different from the first memory, a second transferring step of transferring, to the second memory, the data rasterized on the first memory when the data rasterized on the second memory is transferred to the temporary memory, and a third transferring step of transferring the data generated by the new application to the first memory.

According to the present invention, there is provided a program causing a computer to execute the information processing method.

According to the present invention, there is provided a computer-readable recording medium recording the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18 is a view showing a managing table of wireless video transmission apparatus information in the wireless terminal;

FIG. 23 is a view showing a connection polling table of the wireless terminal according to the second embodiment of the present invention.

DETAILED DESCRIPTION OF THE PREFERRED EMBODIMENTS

A wireless video transmission system according to an embodiment of the present invention will be described below in detail with reference to the accompanying drawings.

First Embodiment

Figure 1:
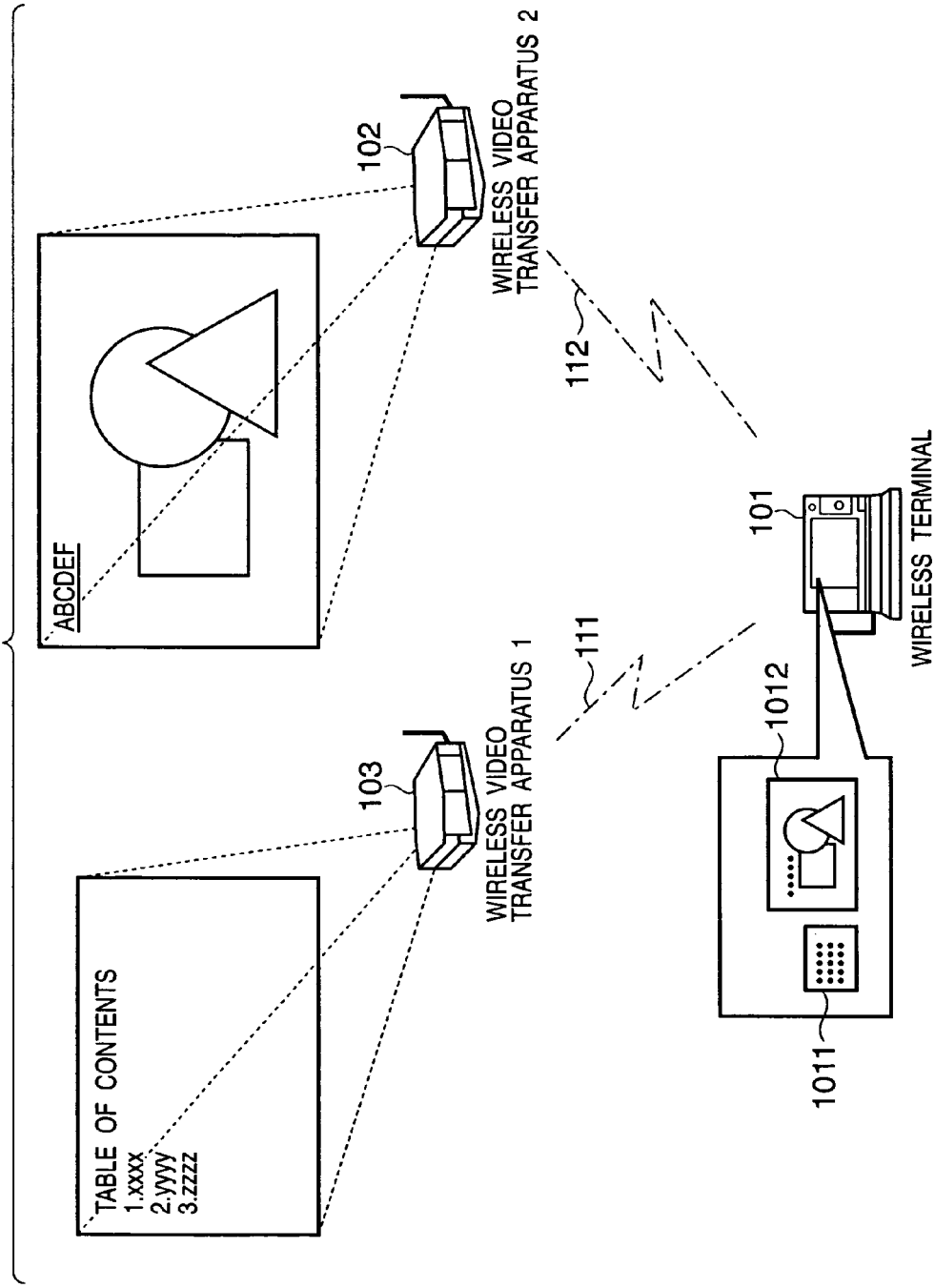
FIG. 1 is a view showing the arrangement of a wireless video transmission system according to the first embodiment of the present invention.

FIG. 1 is a view showing the arrangement of a wireless video transmission system according to the first embodiment of the present invention. Referring to FIG. 1, a wireless terminal 101 such as a PC having a wireless function forms an ad hoc network with a wireless video transmission apparatus 1 (103) and wireless video transmission apparatus 2 (102), which are projection apparatuses having a projection function of projecting an image, by using an arbitrary group identifier. The wireless terminal 101 serving as an IBSS creator broadcasts beacon frame information unique to the ad hoc network to the area. The wireless terminal 101 and wireless video transmission apparatus 1 (103) are connected wirelessly by using medium/low-speed wireless communication 111 such as IEEE802.11b. The wireless terminal 101 and wireless video transmission apparatus 2 (102) are connected wirelessly by using high-speed wireless communication 112 such as IEEE802.11a/g.

Figure 2:
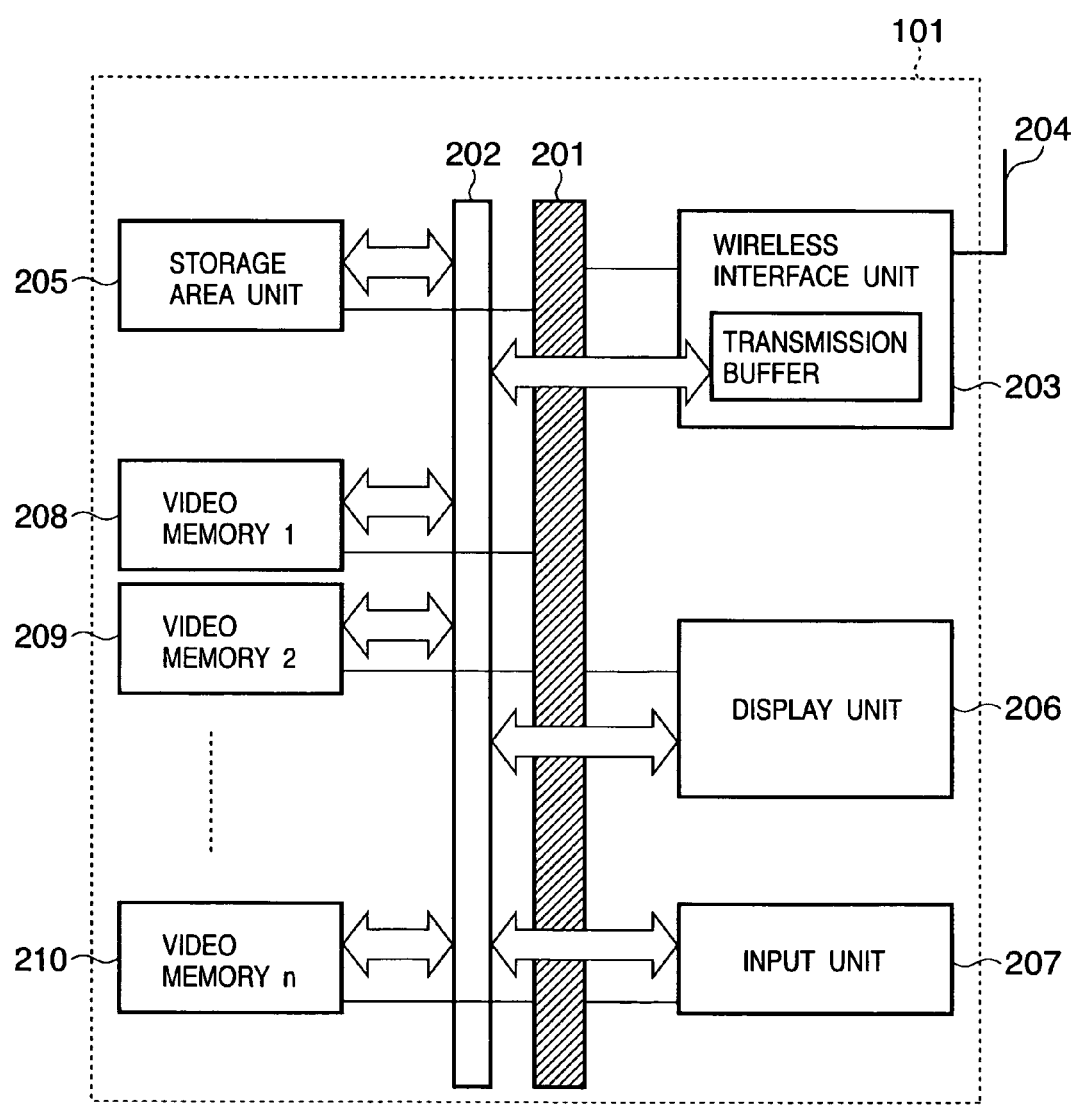
FIG. 2 is a block diagram showing the internal arrangement of a wireless terminal.

FIG. 2 is a block diagram showing the internal arrangement of the wireless terminal 101. A central control unit 201 controls the respective units of the wireless terminal 101. The central control unit 201 also transfers images through a data bus 202 and executes various kinds of system control of the wireless terminal 101 (to be described below). A wireless interface unit 203 executes wireless communication with the wireless video transmission apparatus 1 (103) and wireless video transmission apparatus 2 (102) through an antenna 204 under the control of the central control unit 201. A storage area unit 205 includes a volatile memory having a work area and temporary area used by the central control unit 201 for various kinds of control and by the respective units in the system, and a non-volatile memory which stores the control program and setting data of the apparatus. Under the control of the central control unit 201, a display unit 206 displays the control windows of applications which correspond to the projection screens of the wireless video transmission apparatus 1 (103) and wireless video transmission apparatus 2 (102) in a one-to-one correspondence. The display unit 206 is formed from, e.g., a liquid crystal monitor. An input unit 207 includes the keyboard and mouse (pointing device) of the PC. A video memory 1 (208), video memory 2 (209), and video memory n (210) are image memory areas whose data are transmitted to the wireless video transmission apparatus 1 (103), wireless video transmission apparatus 2 (102), and wireless video transmission apparatus n, respectively.

Figure 4:
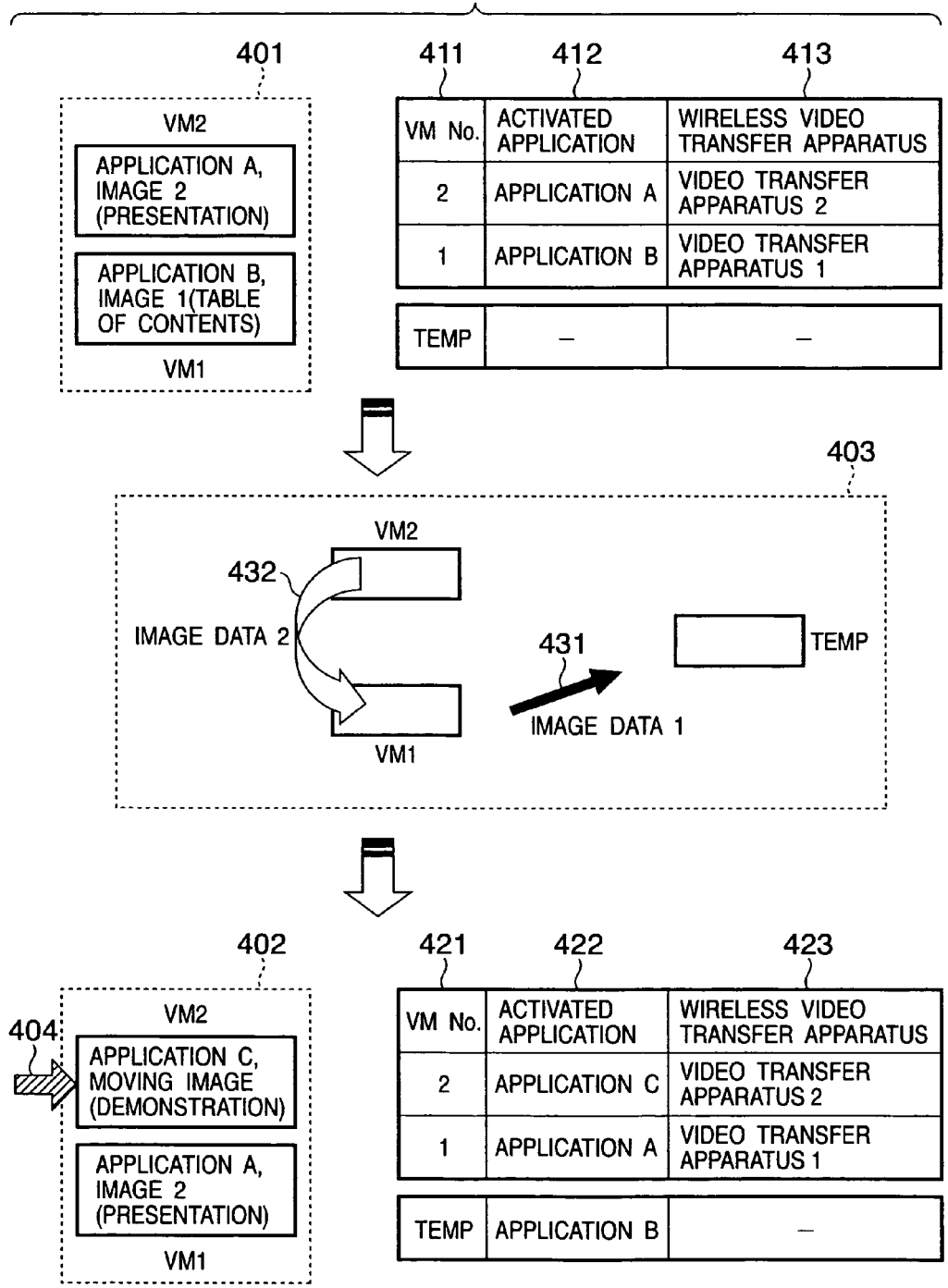
FIG. 4 is a view schematically showing image data transmitting processing.

FIG. 4 is a view for explaining image data transfer processing according to this embodiment. Referring to FIG. 4, reference numeral 401 denotes a data rasterized state of the video memories 1 and 2 before image data transfer processing; 402, a data rasterized state of the video memories 1 and 2 after image data transfer processing; 403, a data rasterized state of the video memories 1 and 2 during image data transfer processing; and 404, activation of a new moving image application.

A managing table including 411 to 413 indicates the relationship between the video memories before image data transfer processing, the activated applications, and the wireless video transmission apparatuses which are transmitting image data. Reference numeral 411 denotes the number of the video memory before image data transfer processing; 412, the identification information of the activated application before image data transfer processing; and 413, the number of the wireless video transmission apparatus which uses the video memory before image data transfer processing.

A managing table including 421 to 423 indicates the relationship between the video memories after image data transfer processing, the activated applications, and the wireless video transmission apparatuses which are transmitting image data. Reference numeral 421 denotes the number of the video memory after image data transfer processing; 422, the identification information of the activated application after image data transfer processing; and 423, the number of the wireless video transmission apparatus which uses the video memory after image data transfer processing. Reference numeral 431 denotes transfer processing of image data 1 (application B) to a temporary memory; and 432, transfer processing of image data 2 (application A) from the video memory 2 to the video memory 1.

Figure 7:
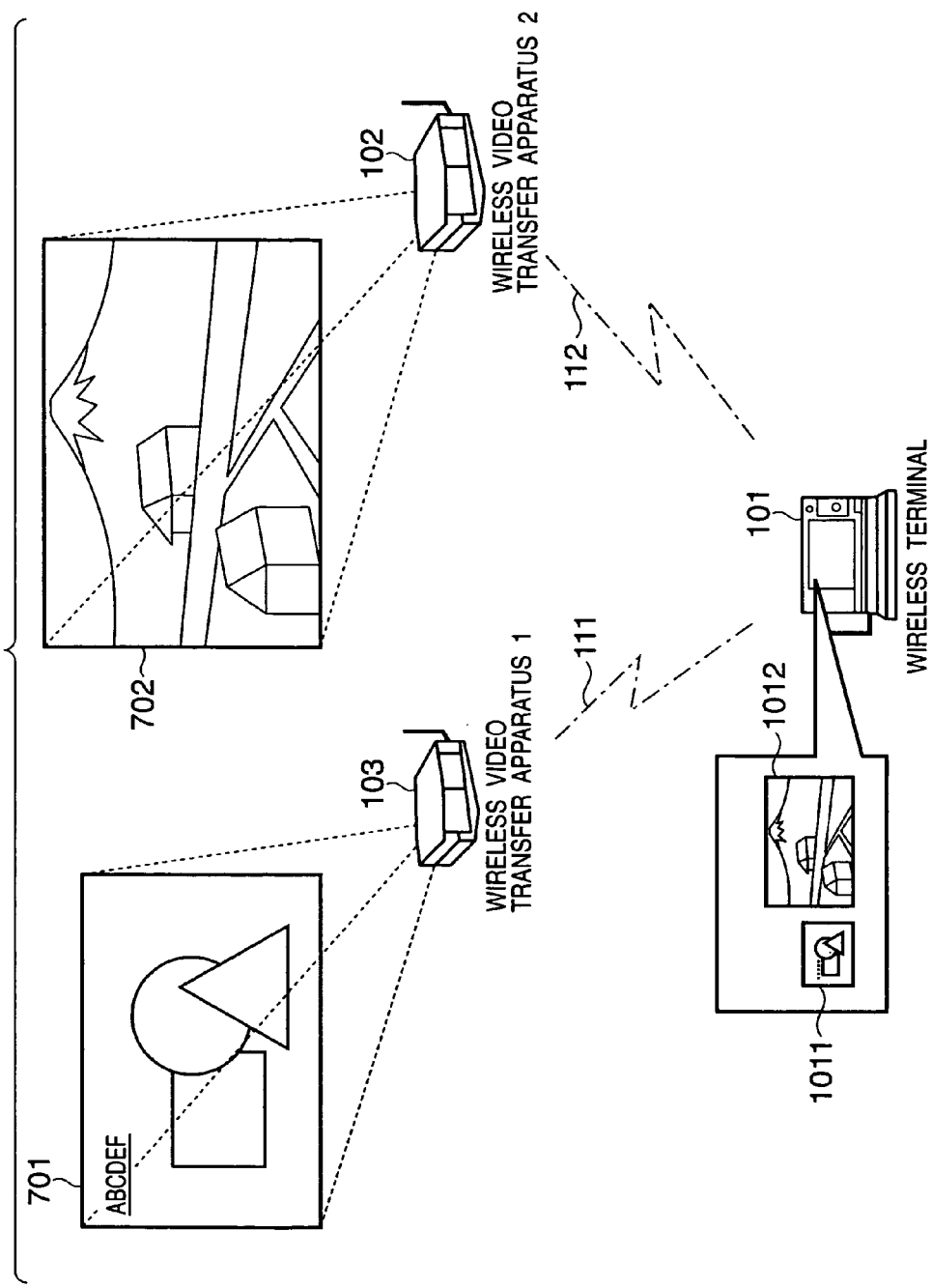
FIG. 7 is a view showing a display example of moving image data by activation of a new application.

FIG. 7 is a view for explaining a display example of image data by activation of a new application according to the first embodiment of the present invention. Reference numeral 701 denotes a projection screen of the image data 2 (application A); and 702, a projection screen of moving image data (application C).

Figure 8:
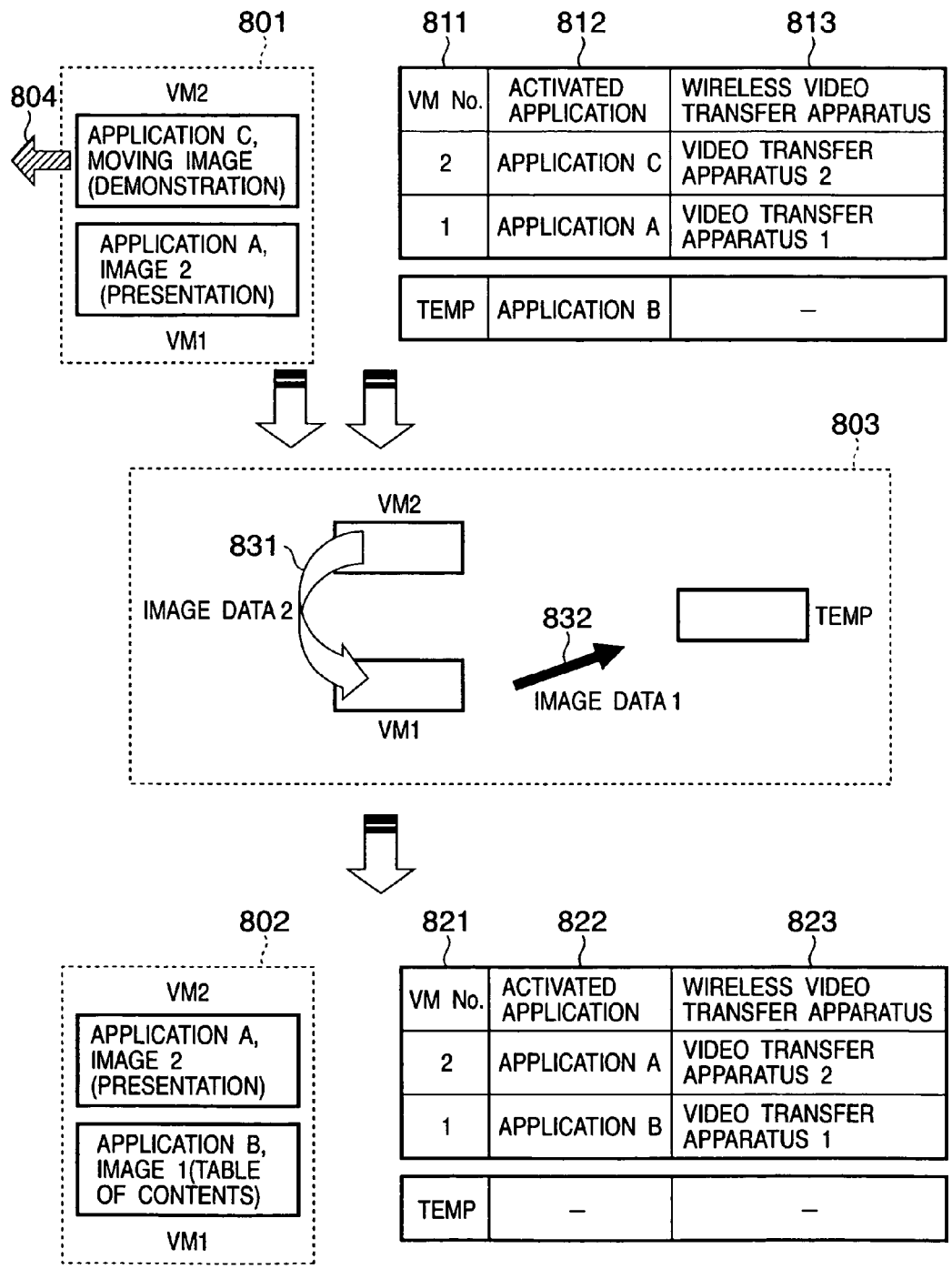
FIG. 8 is a view schematically showing image data restoration transfer processing.

FIG. 8 is a view for explaining image data restoration transfer processing according to this embodiment. Referring to FIG. 8, reference numeral 801 denotes a data rasterized state of the video memories 1 and 2 after image data transfer processing; 802, a data rasterized state of the video memories 1 and 2 after image data restoration processing; 803, a data rasterized state of the video memories 1 and 2 during image data transfer processing; and 804, stop of a new moving image application.

A managing table including 811 to 813 explains the relationship between the video memories after image data transfer processing, the activated applications, and the wireless video transmission apparatuses which are transmitting image data. Reference numeral 811 denotes the number of the video memory after image data transfer processing; 812, the identification information of the activated application after image data transfer processing; and 813, the number of the wireless video transmission apparatus which uses the video memory after image data transfer processing.

A managing table including 821 to 823 indicates the relationship between the video memories after image data restoration processing, the activated applications, and the wireless video transmission apparatuses which are transmitting image data. Reference numeral 821 denotes the number of the video memory after image data restoration processing; 822, the identification information of the activated application after image data restoration processing; and 823, the number of the wireless video transmission apparatus which uses the video memory after image data restoration processing.

Reference numeral 832 denotes transfer processing of the image data 1 (application B) from the temporary memory; and 831, transfer processing of the image data 2 (application A) from the video memory 1 to the video memory 2.

Figure 19:
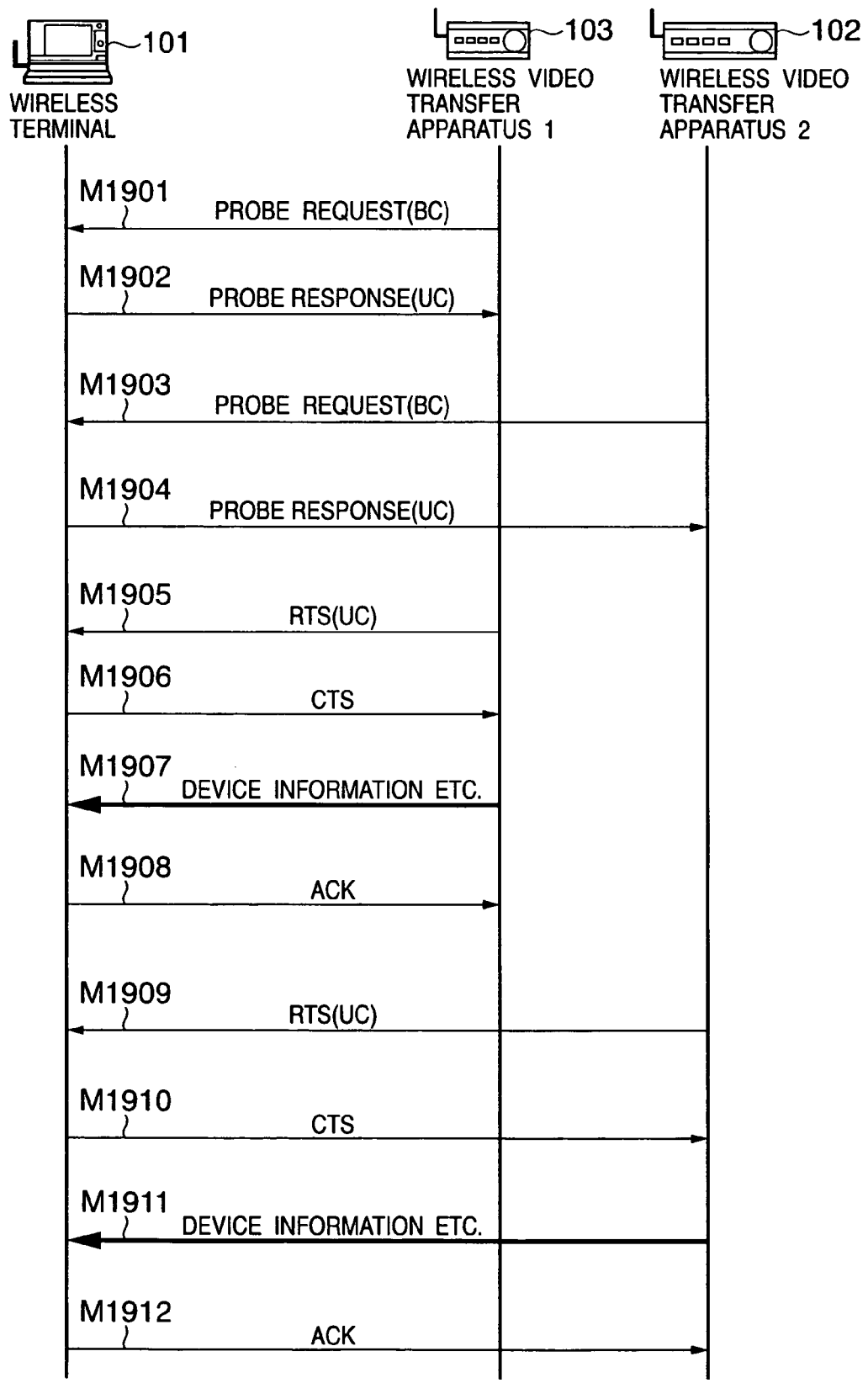
FIG. 19 is a sequence chart showing the flow of processing of the wireless video transmission system according to the first embodiment of the present invention.

The operation of the wireless video transmission system according to the first embodiment of the present invention will be described next in detail. FIG. 19 is a sequence chart showing the flow of the operation of the wireless video transmission apparatus according to this embodiment.

Referring to the sequence chart of the wireless video transmission system shown in FIG. 19, the wireless video transmission apparatus 1 (103) which supports a communication protocol of IEEE802.11b (11b) is activated by power-ON operation. The wireless video transmission apparatus 1 (103) transmits a probe request signal (M1901) containing a broadcast SSID to the area by broadcast and attempts to participate in the ad hoc network which supports 11b. The wireless terminal 101 receives the probe request signal (M1901) and transmits, to the wireless video transmission apparatus 1 (103) by unicast, a probe response signal (M1902) containing a predetermined SSID serving as the group identifier of the ad hoc network which supports 11b. At this time, the wireless terminal 101 registers "medium/low speed" in a supportable communication speed (1802) corresponding to a wireless video transmission apparatus number (1801) in the managing table shown in FIG. 18, which is present in the storage area unit 205. The managing table shown in FIG. 18 is the managing table of the wireless video transmission apparatus information. Reference numeral 1801 denotes the wireless video transmission apparatus number; 1802, the communication speed of the wireless video transmission apparatuses 102 and 103; and 1803, a resolution of the wireless video transmission apparatuses 102 and 103.

Similarly, the wireless video transmission apparatus 2 (102) which supports a communication protocol of IEEE802.11a/g (to be referred to as 11a/g hereinafter) is activated by power-ON operation. The wireless video transmission apparatus 2 (102) transmits a probe request signal (M1903) containing a broadcast SSID to the area by broadcast and attempts to participate in the ad hoc network which supports 11a/g. The wireless terminal 101 receives the probe request signal (M1903) and transmits, to the wireless video transmission apparatus 2 (102) by unicast, a probe response signal (M1904) containing a predetermined SSID serving as the group identifier of the ad hoc network which supports 11a/g. At this time, the wireless terminal 101 registers "high speed" in the supportable communication speed (1802) corresponding to the wireless video transmission apparatus number (1801) in the managing table shown in FIG. 18, which is present in the storage area unit 205.

The wireless terminal 101 forms ad hoc networks with different wireless LAN standards for the plurality of wireless video transmission apparatuses 1 and 2.

The wireless video transmission apparatus 1 (103) transmits an RTS (Request To Send) message (M1905) to the wireless terminal 101 and starts data transmission processing to register various data such as a supportable resolution of its own. Upon receiving the RTS message (M1905), the wireless terminal 101 returns a CTS (Clear To Send) message (M1906) to the wireless video transmission apparatus 1 (103) if data reception is possible.

Upon receiving the CTS message (M1906), the wireless video transmission apparatus 1 (103) transmits, to the wireless terminal 101, device information (M1907) containing various data such as a supportable resolution of its own. The wireless terminal 101 receives the device information (M1907) and registers, e.g., "medium" for the XGA (1024× 768) level in the supportable resolution (1803) of the apparatus corresponding to the wireless video transmission apparatus number (1801) in the managing table shown in FIG. 18, which is present in the storage area unit 205. Then, the wireless terminal 101 returns an ACK (Acknowledgement) message (M1908) as a reception confirmation to the wireless video transmission apparatus 1 (103). From then, the wireless video transmission apparatus 1 (103) and wireless terminal 101 are set in a communication state.

Similarly, the wireless video transmission apparatus 2 (102) transmits an RTS (Request To Send) message (M1909) to the wireless terminal 101 and starts data transmission processing to register various data such as a supportable resolution of its own. Upon receiving the RTS message (M1909), the wireless terminal 101 returns a CTS (Clear To Send) message (M1910) to the wireless video transmission apparatus 2 (102) if data reception is possible.

Upon receiving the CTS message (M1910), the wireless video transmission apparatus 2 (102) transmits, to the wireless terminal 101, device information (M1911) containing various data such as a supportable resolution of its own. The wireless terminal 101 receives the device information (M1911) and registers, e.g., "high" for the SXGA (1280× 1024) level in the supportable resolution (1803) of the apparatus corresponding to the wireless video transmission apparatus number (1801) in the managing table shown in FIG. 18, which is present in the storage area unit 205. Then, the wireless terminal 101 returns an ACK (Acknowledgement) message (M1912) as a reception confirmation to the wireless video transmission apparatus 2 (102). From then, the wireless video transmission apparatus 2 (102) and wireless terminal 101 are set in a communication state.

Processing executed by the central control unit 201 when different applications are activated in the wireless terminal 101 shown in FIG. 1 on control windows corresponding to the wireless video transmission apparatuses 102 and 103 will be described next. The control windows display images to be transmitted to the wireless video transmission apparatuses 1 (103) and 2 (102) and projected. An image displayed in a control window 1011 is transmitted to the wireless video transmission apparatus 1 (103) and projected. An image displayed in a control window 1012 is transmitted to the wireless video transmission apparatus 2 (102) and projected.

Figure 3:
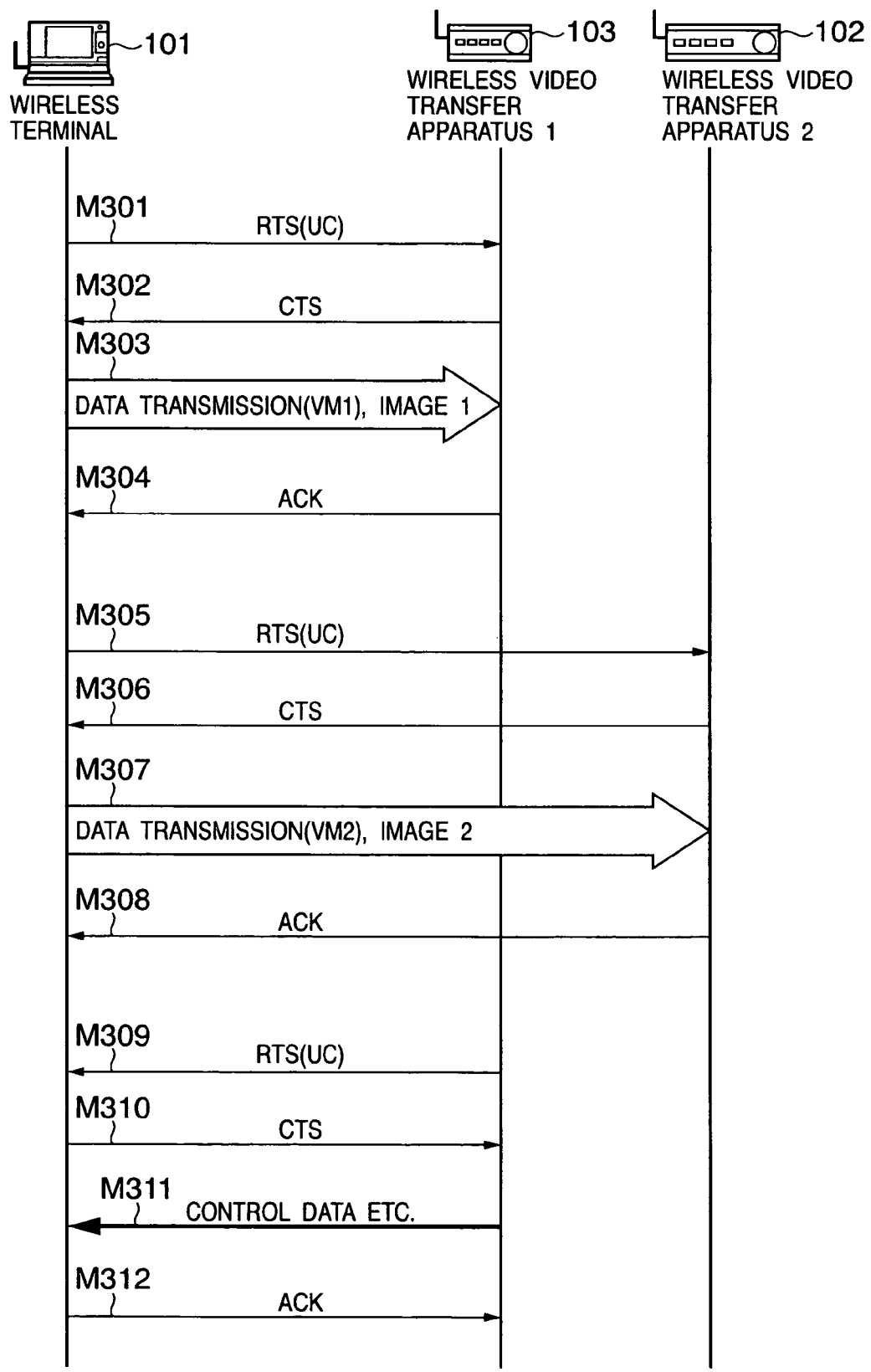
FIG. 3 is a sequence chart showing the flow of processing of the wireless video transmission system according to the first embodiment of the present invention.

In the sequence chart of the wireless video transmission system shown in FIG. 3, when a program called the application B is activated, by the user operation of the wireless terminal 101, on the control window 1011 corresponding to the wireless video transmission apparatus 1 (103), the image data 1 (e.g., a table of contents) of the application B is rasterized on the video memory 1 (VM1) (208).

To transmit the image data 1 to the wireless video transmission apparatus 1 (103), the central control unit 201 of the wireless terminal 101 transfers the image data rasterized on the VM1 to the transmission buffer of the wireless interface unit 203 through the data bus 202. The central control unit 201 also transmits an RTS (Request To Send) message (M301) to the wireless video transmission apparatus 1 (103) and starts data transmission processing. Upon receiving the RTS message (M301), the wireless video transmission apparatus 1 (103) returns a CTS (Clear To Send) message (M302) to the wireless terminal 101 if data reception is possible.

Upon receiving the CTS message (M302), the central control unit 201 of the wireless terminal 101 transmits the image data 1 (M303) in the transmission buffer of the wireless interface unit 203 to the wireless video transmission apparatus 1 (103). Upon receiving the image data 1 (M303), the wireless video transmission apparatus 1 (103) returns an ACK (Acknowledgement) message (M304) as a reception confirmation to the wireless terminal 101 and projects the image data 1 (e.g., a table of contents) on the screen. From then, the wireless terminal 101 continuously transmits, to the wireless video transmission apparatus 1 (103), display data (image data 1) in the control window 1011 activated by the application B, i.e., image data rasterized on the VM1.

Similarly, when a program called the application A is activated on the control window 1012 corresponding to the wireless video transmission apparatus 2 (102), the image data 2 (e.g., a presentation material) of the application A is rasterized on the video memory 2 (VM2) (209) under the control of the central control unit 201.

To transmit the image data 2 to the wireless video transmission apparatus 2 (102), the central control unit 201 of the wireless terminal 101 transfers the image data 2 rasterized on the VM2 to the transmission buffer of the wireless interface unit 203 through the data bus 202. The central control unit 201 also transmits an RTS (Request To Send) message (M305) to the wireless video transmission apparatus 2 (102) and starts data transmission processing. Upon receiving the RTS message (M305), the wireless video transmission apparatus 2 (102) returns a CTS (Clear To Send) message (M306) to the wireless terminal 101 if data reception is possible.

Upon receiving the CTS message (M306), the central control unit 201 of the wireless terminal 101 transmits the image data 2 (M307) in the transmission buffer of the wireless interface unit 203 to the wireless video transmission apparatus 2 (102). Upon receiving the image data 2 (M307), the wireless video transmission apparatus 2 (102) returns an ACK (Acknowledgement) message (M308) as a reception confirmation to the wireless terminal 101 and projects the image data 2 (e.g., a presentation material) on the screen. From then, the wireless terminal 101 continuously transmits, to the wireless video transmission apparatus 2 (102), display data (image data 2) in the control window 1012 activated by the application A, i.e., image data rasterized on the VM2.

At this time, if the wireless video transmission apparatus 1 (103) has control data such as a user's remote control operation to be reflected on the control window 1011 activated by the application B in the wireless terminal 101, the wireless video transmission apparatus 1 (103) transmits an RTS (Request To Send) message (M309) to the wireless terminal 101 and starts data transmission processing to transmit the control data to the wireless terminal 101. Upon receiving the RTS message (M309), the wireless terminal 101 returns a CTS (Clear To Send) message (M310) to the wireless video transmission apparatus 1 (103) if data reception is possible.

Upon receiving the CTS message (M310), the wireless video transmission apparatus 1 (103) transmits, to the wireless terminal 101, control data (M311) to be reflected on the control window activated by the application B. Upon receiving the control data (M311), the wireless terminal 101 returns an ACK (Acknowledgement) message (M312) as a reception confirmation to the wireless video transmission apparatus 1 (103) and reflects the control data on the display in the control window 1011 activated by the application B.

Similarly, if the wireless video transmission apparatus 2 (102) has control data to be reflected on the control window activated by the application B, control data transmission processing for the wireless terminal 101 is executed, as in the wireless video transmission apparatus 1 (103).

When the wireless video transmission apparatus 1 (103) projects the image data 1 (e.g., a table of contents) on the screen, and the wireless video transmission apparatus 2 (102) projects the image data 2 (e.g., a presentation material) on the screen, the image data of the individual applications are rasterized on the VM1 (208) and VM2 (209), as indicated by 401 in FIG. 4. As indicated by 411 to 413 in FIG. 4, the managing table in the storage area unit 205 of the wireless terminal 101 stores the activated application 412 and the wireless video transmission apparatus 413 which is transmitting data in correspondence with the VM number 411.

The data rasterized state 403 of the VM1/VM2 when, in this state, the application C to reproduce a demonstration moving image is newly activated in the wireless terminal 101 will be described. Display of the application A is set to have a priority over display of the application B. When another display is instructed by activating a new application, display of the application B with a low priority is temporarily stopped. Then, the newly instructed display and display of the application A are done.

Figure 6:
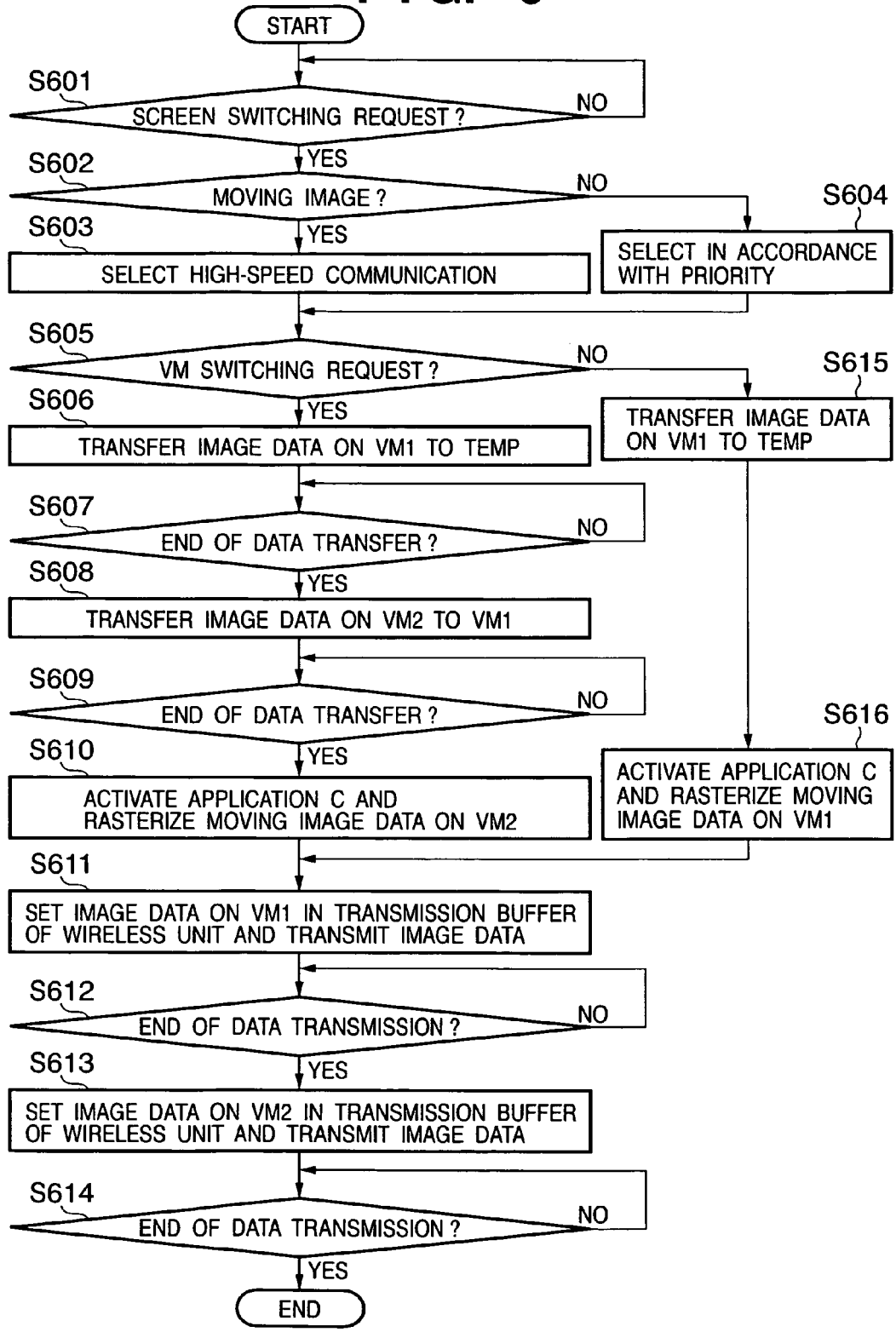
FIG. 6 is a flowchart showing the flow of processing of the wireless terminal according to the first embodiment of the present invention.

Referring to FIG. 6, when the new application C is activated by the user operation, the central control unit 201 activates a screen switching request to newly display an image reproduced by the application C (step S601). When the screen switching request is activated, the central control unit 201 determines whether the image reproduced by the application C is a moving image or still image (step S602). If the image reproduced by the application C is a moving image, the data amount is large. Hence, the wireless video transmission apparatus 2 (102) which communicates by using a wireless system with a high communication speed is selected (step S603). If the image is a still image, of the applications A and B which are already displaying images, display of the application B with a low priority is temporarily stopped. Then, the wireless video transmission apparatus 1 (103) as the transmission destination of the image data 1 of the application B is selected (step S604).

When the wireless video transmission apparatus to display the image of the application C is selected in step S603 or S604, the central control unit 201 determines whether switching of the video memory VM is necessary (step S605). Switching of the VM is necessary when the wireless video transmission apparatus (the wireless video transmission apparatus 2 (102) which communicates by using a wireless system with a high communication speed) which displays the image rasterized on the video memory by the application A with the high priority is selected as the display destination of the image of the newly activated application C, the video memory on which the application A rasterized the image is used by the newly activated application C, and the image of the application A is moved to the video memory on which the application B rasterized the image. Switching of the VM is unnecessary when the wireless video transmission apparatus which displays the image rasterized on the video memory by the application B with the low priority is selected as the display destination of the image of the newly activated application C, the video memory on which the application A rasterized the image is continuously used by the application A, and newly activated application C uses the video memory used by the application B. In this example, the VM is switched when the wireless video transmission apparatus 2 (102) which uses the optimum communication protocol for transmitting an image generated by the application C is selected. As another embodiment, the VM may be switched when the wireless video transmission apparatus 2 (102) is selected because it has the optimum display performance for displaying an image generated by an application.

When the central control unit 201 determines in step S605 that switching of the VM is necessary, the image data 1 rasterized on the VM1 used for display of the application B with the low priority is transferred to the temporary (TEMP) memory (step S606). In this case, the communication speed is referred to as the element to select the optimum wireless video transmission apparatus. However, the present invention is not limited to this, and various settings in the communication protocol may be used as the element to select the wireless video transmission apparatus.

When data transfer is ended (YES in step S607), the central control unit 201 transfers the image data 2 rasterized on the VM2 (209) to the VM1 (208), as indicated by 432 in FIG. 4 (step S608). When data transfer is ended (YES in step S609), the application C is activated, and moving image data reproduced by the application C is rasterized on the VM2 (209), as indicated by 404 in FIG. 4 (step S610).

At this time, as indicated by 421 to 423 in FIG. 4, the managing table in the storage area unit 205 of the wireless terminal 101 stores the activated application 422 and the wireless video transmission apparatus 423 which is transmitting data in correspondence with the VM number 421. The data of the application A is rasterized on the VM1 (208), and the data of the application C is rasterized on the VM2 (209), as indicated by 402 in FIG. 4. The image data 1 of the application B is rasterized on the temporary (TEMP) memory.

Figure 5:
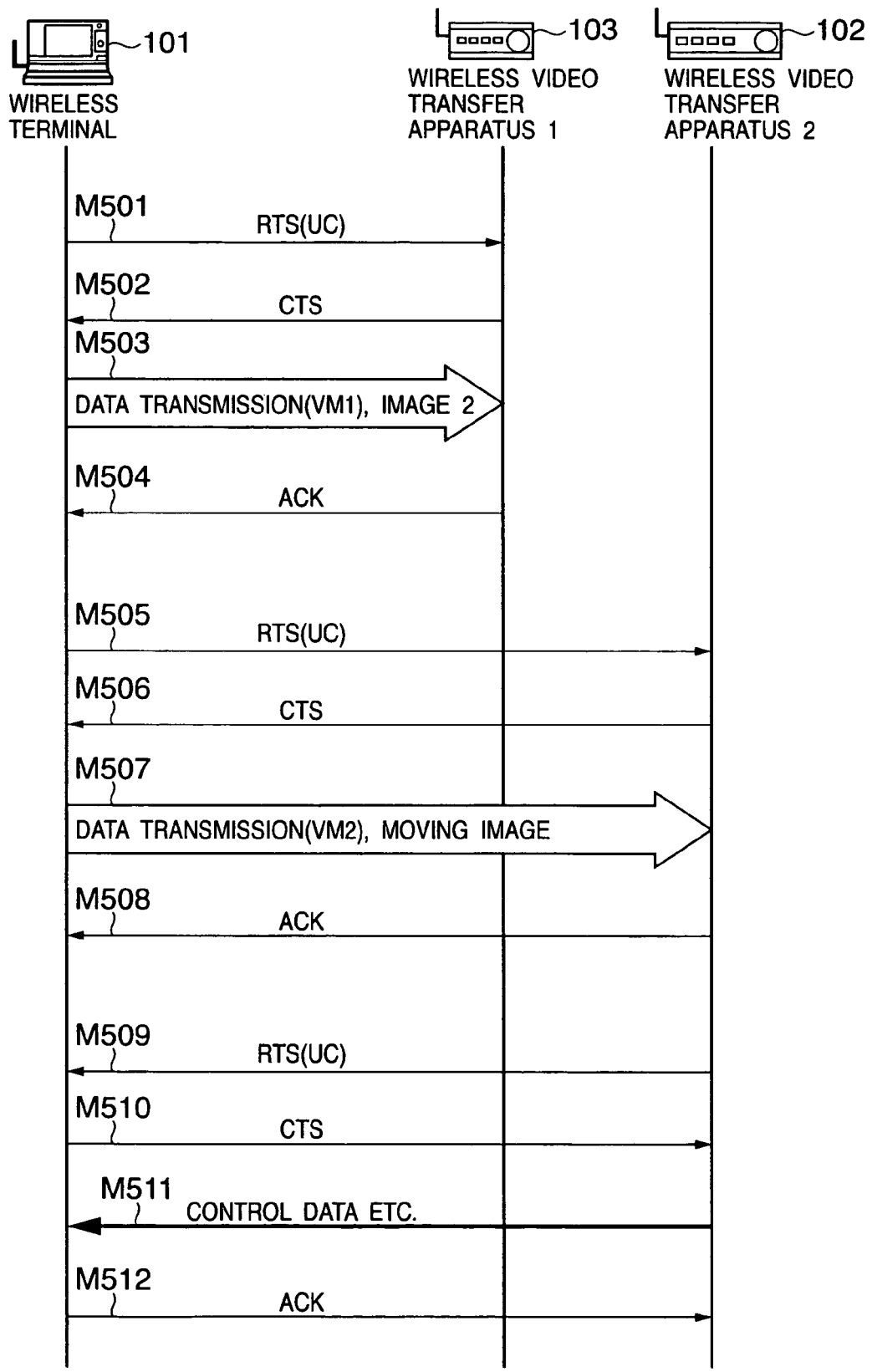
FIG. 5 is a sequence chart showing the flow of processing of the wireless video transmission system according to the first embodiment of the present invention.

To transmit the image data 2 to the wireless video transmission apparatus 1 (103), the wireless terminal 101 transfers the image data 2 rasterized on the VM1 to the transmission buffer of the wireless interface unit 203 through the data bus 202. The wireless terminal 101 also transmits an RTS (Request To Send) message (M501 in FIG. 5) to the wireless video transmission apparatus 1 (103) and starts data transmission processing. Upon receiving the RTS message (M501), the wireless video transmission apparatus 1 (103) returns a CTS (Clear To Send) message (M502) to the wireless terminal 101 if data reception is possible.

Upon receiving the CTS message (M502), the wireless terminal 101 transmits the image data 2 (M503) in the transmission buffer of the wireless interface unit 203 to the wireless video transmission apparatus 1 (103) (step S611). Upon receiving the image data 2 (M503), the wireless video transmission apparatus 1 (103) returns an ACK (Acknowledgement) message (M504) as a reception confirmation to the wireless terminal 101 and projects the image data 2 (presentation material) on the screen, as indicated by 701 in FIG. 7. Transfer of the image data 2 (M503) is ended (YES in step S612). From then, the wireless terminal 101 continuously transmits, to the wireless video transmission apparatus 1 (103), display data (image data 2) in the control window activated by the application A, i.e., image data rasterized on the VM1.

Similarly, to transmit moving image data (demonstration) reproduced by the application C to the wireless video transmission apparatus 2 (102), the wireless terminal 101 transfers the moving image data (demonstration) rasterized on the VM2 to the transmission buffer of the wireless interface unit 203 through the data bus 202. The wireless terminal 101 also transmits an RTS (Request To Send) message (M505 in FIG. 5) to the wireless video transmission apparatus 2 (102) and starts data transmission processing. Upon receiving the RTS message (M505), the wireless video transmission apparatus 2 (102) returns a CTS (Clear To Send) message (M506) to the wireless terminal 101 if data reception is possible.

Upon receiving the CTS message (M506), the wireless terminal 101 transmits the moving image data (demonstration) (M507) in the transmission buffer of the wireless interface unit 203 to the wireless video transmission apparatus 2 (102) (step S613). Upon receiving the moving image data (demonstration) (M507), the wireless video transmission apparatus 2 (102) returns an ACK (Acknowledgement) message (M508) as a reception confirmation to the wireless terminal 101 and projects the moving image data (demonstration) on the screen as indicated by 702 in FIG. 7. Transfer of the moving image data (demonstration) (M507) is ended (YES in step S614). From then, the wireless terminal 101 continuously transmits, to the wireless video transmission apparatus 2 (102), display data (moving image data (demonstration)) in the control window activated by the application C, i.e., image data rasterized on the VM2.

At this time, if the wireless video transmission apparatus 2 (102) has control data such as a user's remote control operation to be reflected on the control window activated by the application C in the wireless terminal 101, the wireless video transmission apparatus 2 (102) transmits an RTS (Request To Send) message (M509) to the wireless terminal 101 and starts data transmission processing to transmit the control data to the wireless terminal 101. Upon receiving the RTS message (M509), the wireless terminal 101 returns a CTS (Clear To Send) message (M510) to the wireless video transmission apparatus 2 (102) if data reception is possible.

Upon receiving the CTS message (M510), the wireless video transmission apparatus 2 (102) transmits, to the wireless terminal 101, control data (M511) to be reflected on the control window activated by the application C. Upon receiving the control data (M511), the wireless terminal 101 returns an ACK (Acknowledgement) message (M512) as a reception confirmation to the wireless video transmission apparatus 2 (102) and reflects the control data on the control window activated by the application C.

Similarly, if the wireless video transmission apparatus 1 (103) has control data to be reflected on the control window activated by the application A, control data transmission processing for the wireless terminal 101 is executed, as in the wireless video transmission apparatus 2 (102).

When it is determined in step S605 that switching of the VM is not requested, i.e., the image produced by the application C is to be rasterized on the VM1, the image data 1 rasterized by the application B is transferred to the temporary (TEMP) memory (step S615). The application C is activated. Image data reproduced by the application C is rasterized on the VM1 (step S616). The flow advances to step S611 to transmit image data rasterized on the VM1 and VM2 to the wireless video transmission apparatuses 1 and 2 by subsequent processing. In this embodiment, since the application C reproduces a moving image, the wireless video transmission apparatus 2 (102) to execute high-speed communication is selected in step S603, and it is determined in step S605 that switching of the VM is necessary.

Figure 9:
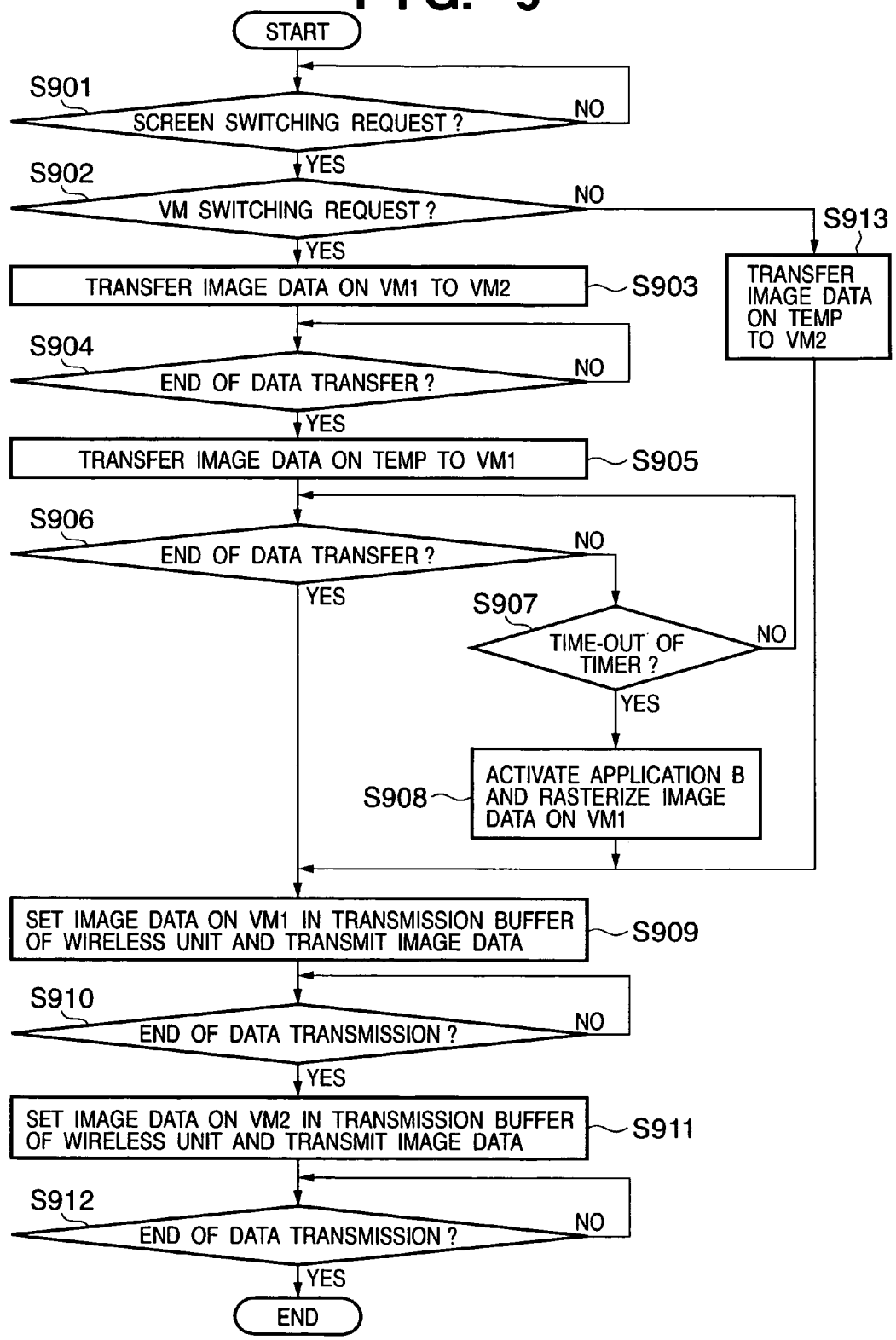
FIG. 9 is a flowchart showing the flow of processing of the wireless terminal according to the first embodiment of the present invention.

Processing of the wireless terminal 101 when the application C (the application C is reproducing the moving image for demonstration) is ended will be described next with reference to FIGS. 7 to 9 by exemplifying the data rasterized state 803 of the VM1/VM2.

When the wireless video transmission apparatus 1 (103) projects the image data 2 (presentation material) on the screen, as indicated by 701 in FIG. 7, and the wireless video transmission apparatus 2 (102) projects the moving image data (demonstration) on the screen, as indicated by 702 in FIG. 7, the image data of the individual applications are rasterized on the VM1 (208) and VM2 (209), as indicated by 801 in FIG. 8. As indicated by 811 to 813 in FIG. 8, the managing table in the storage area unit 205 of the wireless terminal 101 stores the activated application 812 and the wireless video transmission apparatus 813 which is transmitting data in correspondence with the VM number 811.

When the wireless terminal 101 detects the end (804) of the application C in this state, the central control unit 201 activates a screen switching request (YES in step S901) and determines whether switching of the VM is necessary (step S902). To select an optimum wireless video transmission apparatus for display of the image data 2 of the application A, the supportable resolution (1803) corresponding to the wireless video transmission apparatus number in the managing table as shown in FIG. 18, which is present in the storage area unit 205 of the wireless terminal 101, is referred to. If the application A is, e.g., an application (e.g., Excel or Power Point) which prefers to display of high-resolution image data, the central control unit 201 selects the wireless video transmission apparatus 2 (102) capable of projecting a high-resolution image for the application A and activates a VM switching request (YES in step S902). In this case, the central control unit 201 transfers the image data 2 rasterized on the VM1 (208) to the VM2 (209), as indicated by 831 in FIG. 8 (step S903). In this case, the resolution is used as the element to select the optimum wireless video transmission apparatus. However, the present invention is not limited to this, and various kinds of image data display performance may be used as the element to select the apparatus. In this embodiment, when the wireless video transmission apparatus 2 (102) capable of displaying high-resolution image data is selected, the VM switching request is activated. As another embodiment, the VM may be switched when the wireless video transmission apparatus 2 (102) is selected because it uses the optimum communication protocol for transmitting an image generated by the application A. Alternatively, the VM may be switched to restore the state before activation of the application C.

When data transfer is ended (YES in step S904), the central control unit 201 transfers the image data 1 rasterized on the temporary (TEMP) memory to the VM1 (208), as indicated by 832 in FIG. 8 (step S905). If data transfer is not ended (NO in step S906), the central control unit 201 checks whether the transfer timer indicates time-out. Upon time-out (YES in step S907), the application B is activated on the control window, and the image data 1 (table of contents) is rasterized on the VM1 (208) (step S908).

At this time, the managing table in the storage area unit 205 of the wireless terminal 101 stores the activated application 822 and information of the wireless video transmission apparatus 823 which is transmitting data in correspondence with the VM number 821. The data of the application B is rasterized on the VM1 (208), and the data of the application A is rasterized on the VM2 (209), as indicated by 802 in FIG. 8. The temporary (TEMP) memory is free.

When data transfer is ended (YES in step S906), to transmit the image data 1 to the wireless video transmission apparatus 1 (103), the wireless terminal 101 transfers the image data 1 rasterized on the VM1 to the transmission buffer of the wireless interface unit 203 through the data bus 202. The wireless terminal 101 also transmits an RTS (Request To Send) message (M301 in FIG. 3) to the wireless video transmission apparatus 1 (103) and starts data transmission processing. Upon receiving the RTS message (M301), the wireless video transmission apparatus 1 (103) returns a CTS (Clear To Send) message (M302) to the wireless terminal 101 if data reception is possible.

Upon receiving the CTS message (M302), the wireless terminal 101 transmits the image data 1 (M303) in the transmission buffer of the wireless interface unit 203 to the wireless video transmission apparatus 1 (103) (step S909). Upon receiving the image data 1 (M303), the wireless video transmission apparatus 1 (103) returns an ACK (Acknowledgement) message (M304) as a reception confirmation to the wireless terminal 101 and projects the image data 1 (table of contents) on the screen. Transfer of the image data 1 (M303) is ended (YES in step S910). From then, the wireless terminal 101 continuously transmits, to the wireless video transmission apparatus 1 (103), display data (image data 1) in the control window activated by the application B, i.e., image data rasterized on the VM1.

Similarly, to transmit the image data 2 (presentation material) to the wireless video transmission apparatus 2 (102), the wireless terminal 101 transfers the image data 2 (presentation material) rasterized on the VM2 to the transmission buffer of the wireless interface unit 203 through the data bus 202. The wireless terminal 101 also transmits an RTS (Request To Send) message (M305) to the wireless video transmission apparatus 2 (102) and starts data transmission processing. Upon receiving the RTS message (M305), the wireless video transmission apparatus 2 (102) returns a CTS (Clear To Send) message (M306) to the wireless terminal 101 if data reception is possible.

Upon receiving the CTS message (M306), the wireless terminal 101 transmits the image data 2 (M307) in the transmission buffer of the wireless interface unit 203 to the wireless video transmission apparatus 2 (102) (step S911). Upon receiving the image data 2 (M307), the wireless video transmission apparatus 2 (102) returns an ACK (Acknowledgement) message (M308) as a reception confirmation to the wireless terminal 101 and projects the image data 2 (presentation material) on the screen. Transfer of the image data 2 (M307) is ended (YES in step S912). From then, the wireless terminal 101 continuously transmits, to the wireless video transmission apparatus 2 (102), display data (image data (presentation material)) in the control window activated by the application A, i.e., image data rasterized on the VM2.

If the wireless video transmission apparatus 1 (103) or 2 (102) has control data to be reflected on the control window activated by the application, control data transmission processing (steps S309 to S312 in FIG. 3 or steps S509 to S512 in FIG. 5) for the wireless terminal 101 is executed. If it is determined in step S902 that, e.g., the application A is an application (e.g., Word) which requires no high-resolution display, and the central control unit 201 does not activate the VM switching request, the image data 2 is not transferred from the VM1 to the VM2. Instead, the image data 1 rasterized on the temporary (TEMP) memory is transferred to the VM2 (step S913). Hence, the image data 1 is transmitted to the wireless video transmission apparatus 2 (102) by the processing in steps S909 to S912. The image data 2 is directly transmitted to the wireless video transmission apparatus 1 (103). The image data 2 and 1 are displayed by the wireless video transmission apparatuses 1 (103) and 2 (102), respectively.

Second Embodiment

A wireless video transmission system according to the second embodiment of the present invention will be described next. In this embodiment, a communication network is established between a wireless terminal 101 and a wireless video transmission apparatus 1 (103) and wireless video transmission apparatus 2 (102) by communication procedures different from those of the above-described first embodiment. Even in the communication network established by the communication procedures of this embodiment, the wireless terminal 101 can switch the application to rasterize image data between a VM1 and VM2 and transmit image data rasterized by switching to the wireless video transmission apparatus 1 (103) and wireless video transmission apparatus 2 (102), as in the first embodiment.

Figure 10:
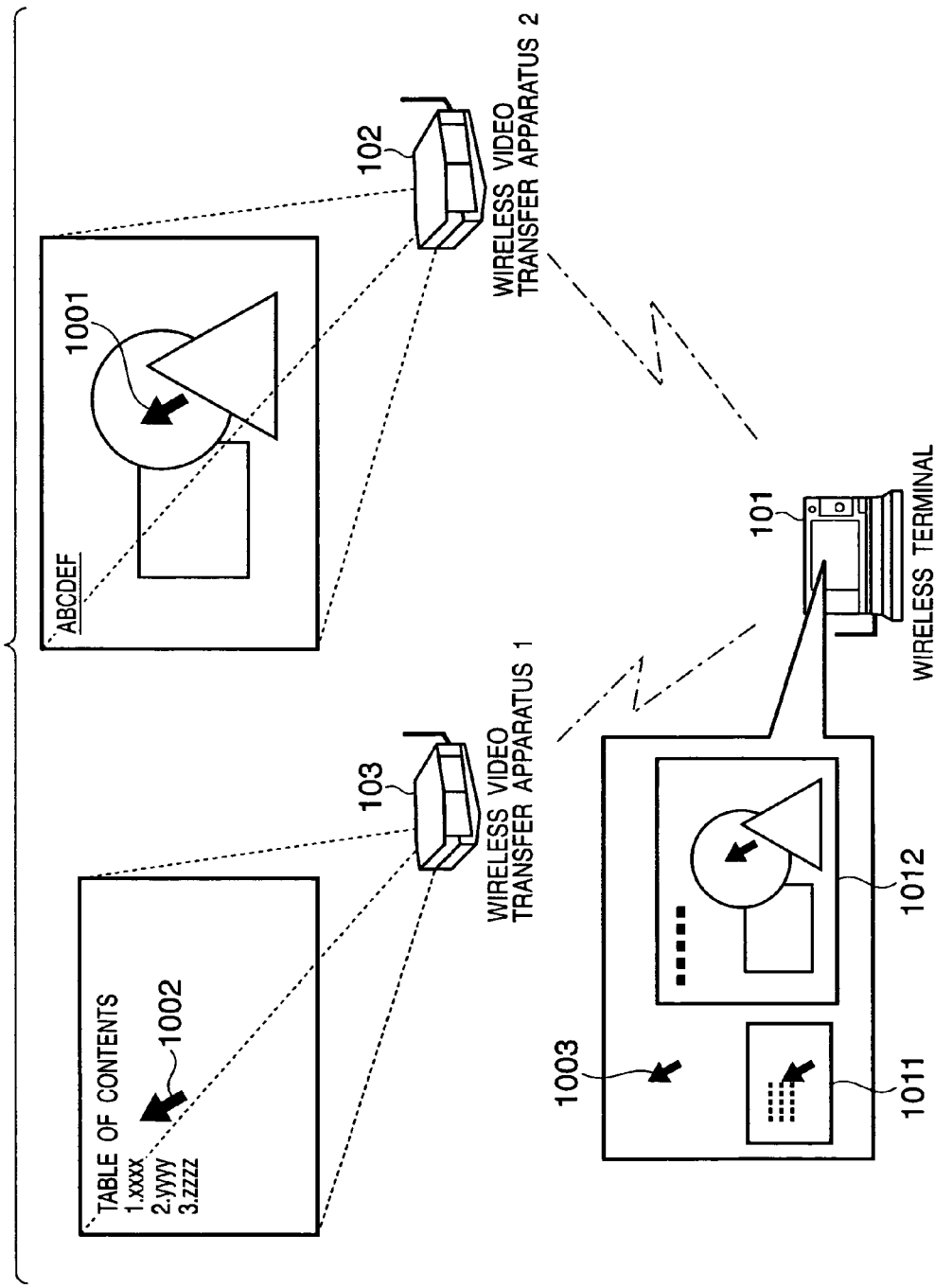
FIG. 10 is a view showing the arrangement of a wireless video transmission system according to the second and third embodiments of the present invention.

FIG. 10 is a view showing the arrangement of the wireless video transmission system according to the second embodiment of the present invention. Referring to FIG. 10, the wireless terminal 101 such as a PC forms an infrastructure network with the wireless video transmission apparatus 1 (103) and wireless video transmission apparatus 2 (102) by using an arbitrary group identifier. Beacon frame information unique to the infrastructure network is broadcast to the area as an access point. The wireless terminal 101 and wireless video transmission apparatus 1 (103) are connected wirelessly by using medium/low-speed wireless communication such as IEEE802.11b or high-speed wireless communication such as IEEE802.11a/g. Reference numeral 1001 denotes a mouse cursor (remote control operation) which has a control right in the wireless video transmission apparatus 2 (102); 1002, a mouse cursor (remote control operation) which has a control right in the wireless video transmission apparatus 1 (103); 1003, a mouse cursor (mouse pad operation) which has a control right in the wireless terminal 101; 1011, a control window of an application B which is displayed on a display unit 206 of the wireless terminal 101; and 1012, a control window of an application A.

Figure 12:
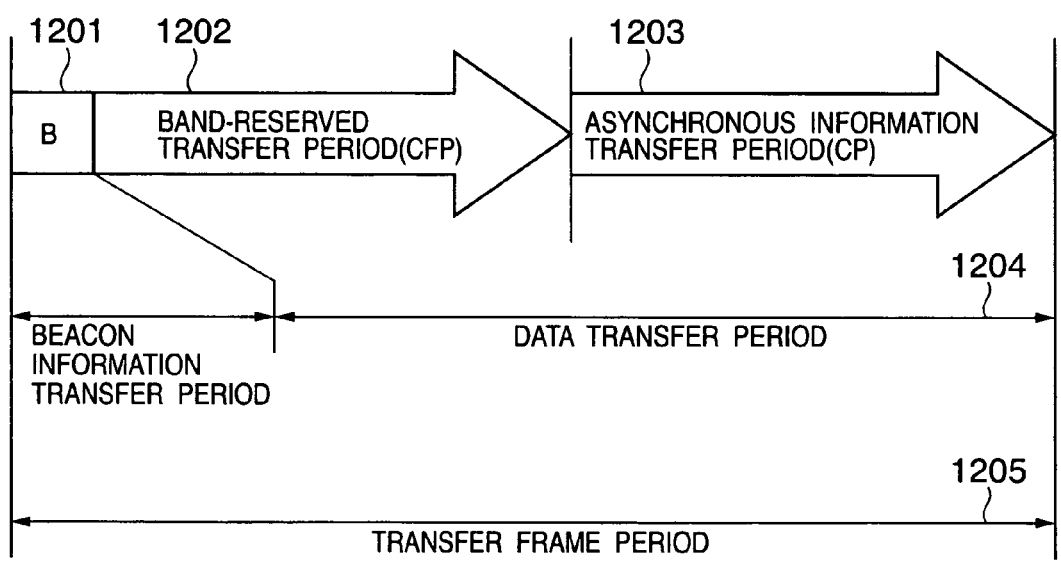
FIG. 12 is a view showing the format of a wireless LAN transmission frame.

FIG. 12 is a view showing a format example of a wireless transmission frame in a wireless LAN network formed by the wireless terminal 101 and wireless video transmission apparatuses. For the descriptive convenience, a frame is defined here. However, such a frame structure need not always be used.

In IEEE802.11 as the standard of wireless LAN, a wireless access protocol between a wireless access station and a terminal is defined. In this standard, PCF (Point Coordination Function) is defined as an optional function in addition to DCF (Distributed Coordination Function) as a random access function in CP (Contention Period) by CSMA/CA (Carrier Sense Multiple Access with Collision Avoidance). In this function, CFP (Contention Free Period) is periodically set on a radio channel used by the wireless access station for communication. In CFP, a contention free access is done by polling.

Referring to FIG. 12, a transmission frame which arrives for every predetermined transmission frame period 1205 is defined. A beacon information transmission period 1201 and data transmission period 1204 are provided in the transmission frame. The beacon information transmission period 1201 for broadcast of the frame period or network common information is arranged at the start of the frame. The beacon information is a managing period (frame synchronous area) containing frame synchronous information. The beacon information is assigned to each of the wireless video transmission apparatus 1 (103) and wireless video transmission apparatus 2 (102) of the network and designed to prevent contention of transmission of the wireless video transmission apparatuses. This information contains information of a period band-reserved in the data transmission period and information of an asynchronous transmission period.

A band-reserved transmission period 1202 is also called a contention free period (CFP), which is a time period usable by an arbitrary wireless terminal by polling from the wireless terminal 101. An asynchronous information transmission period 1203 is also called a contention period (CP), which is a time period to communicate at random by using predetermined procedures. That is, the data transmission period 1204 includes the band-reserved transmission period (CFP) 1202 set as needed and the asynchronous transmission period (CP) 1203 as the remaining portion.

Figure 11:
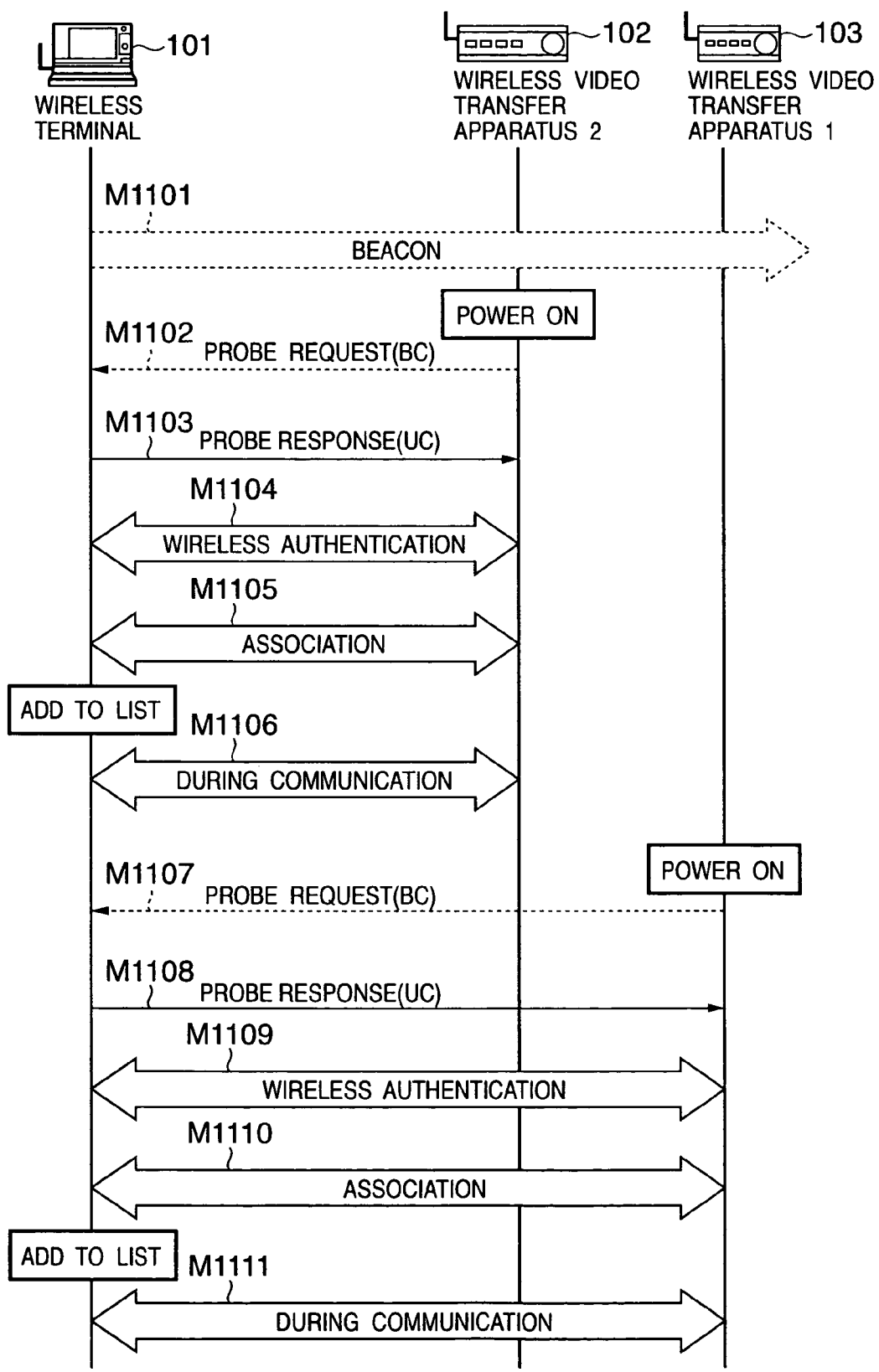
FIG. 11 is a sequence chart showing the flow of processing of the wireless video transmission system according to the second embodiment of the present invention.
Figure 13:
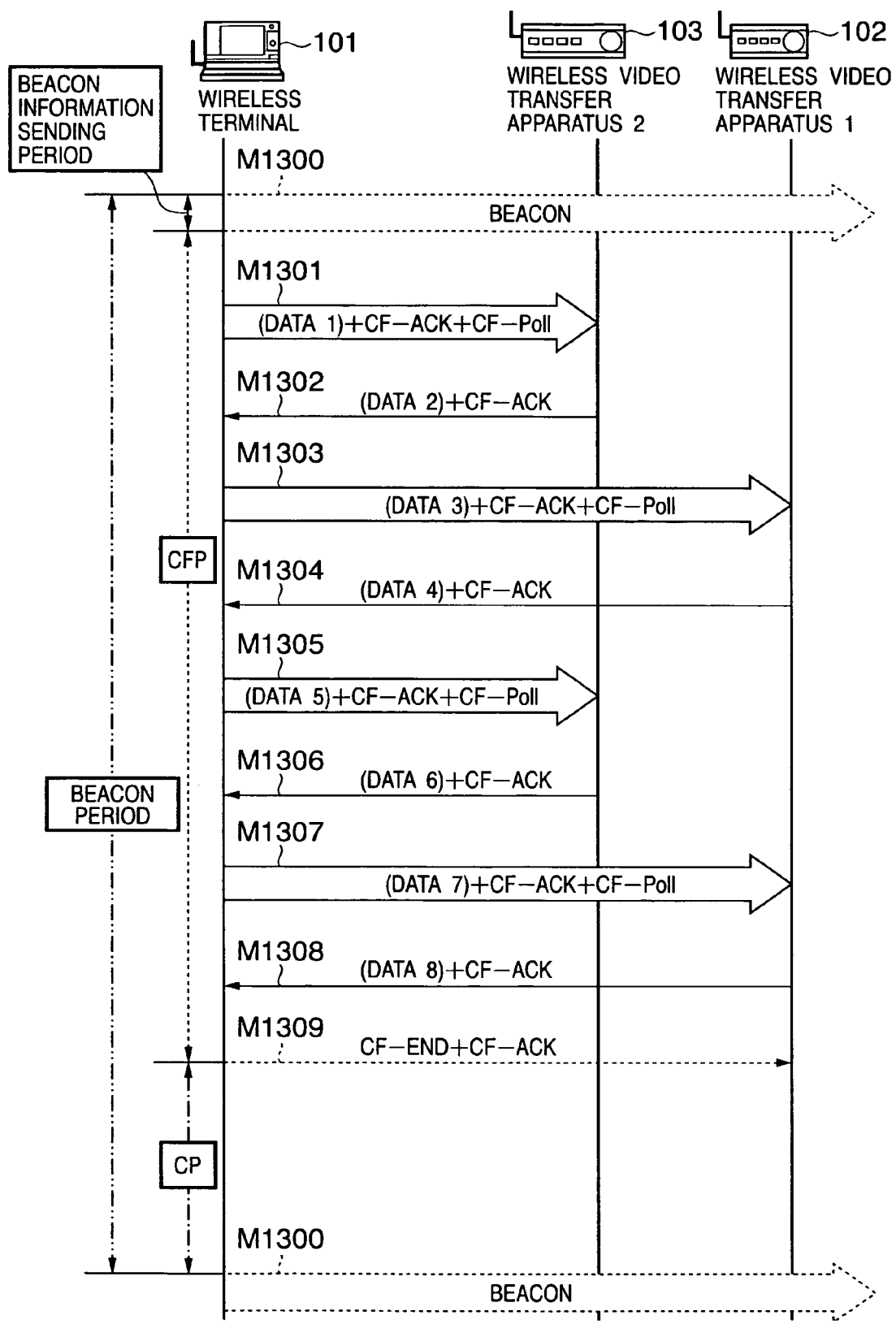
FIG. 13 is a sequence chart showing the flow of processing of the wireless video transmission system according to the second embodiment of the present invention.
Figure 14:
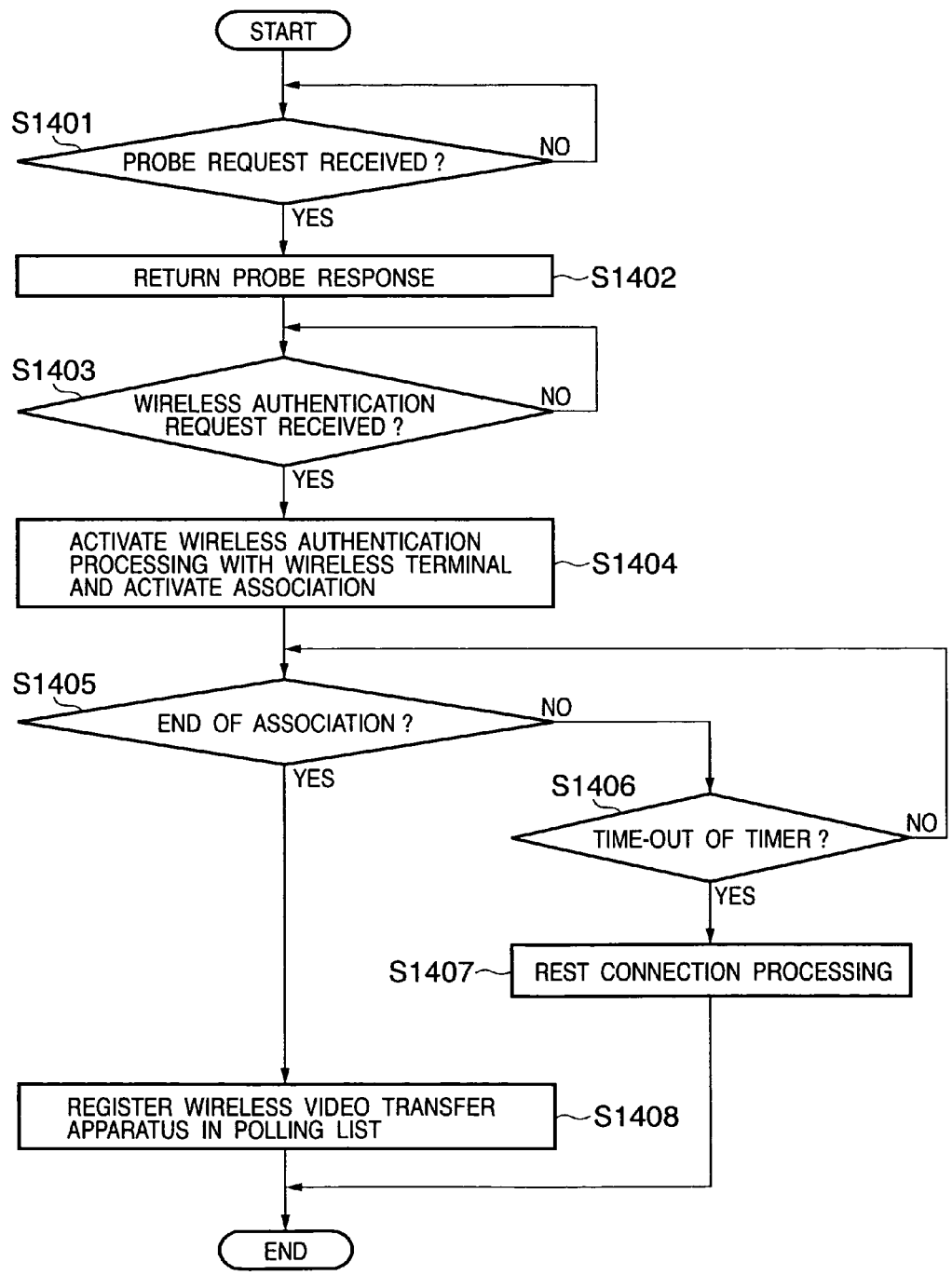
FIG. 14 is a flowchart showing the flow of processing of a wireless terminal according to the second embodiment of the present invention.
Figure 16:
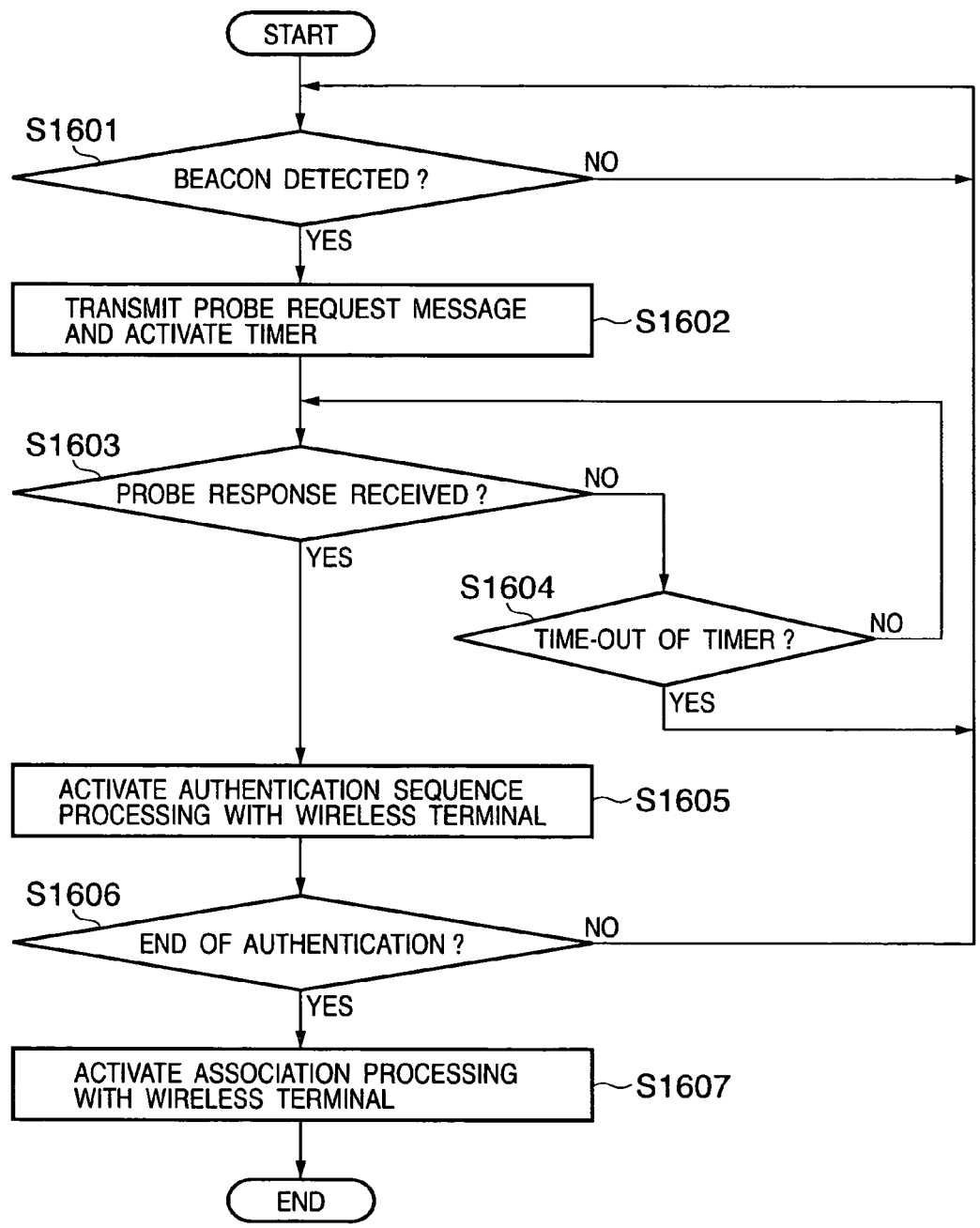
FIG. 16 is a flowchart showing the flow of processing of a wireless video transmission apparatus according to the second embodiment of the present invention.
Figure 17:
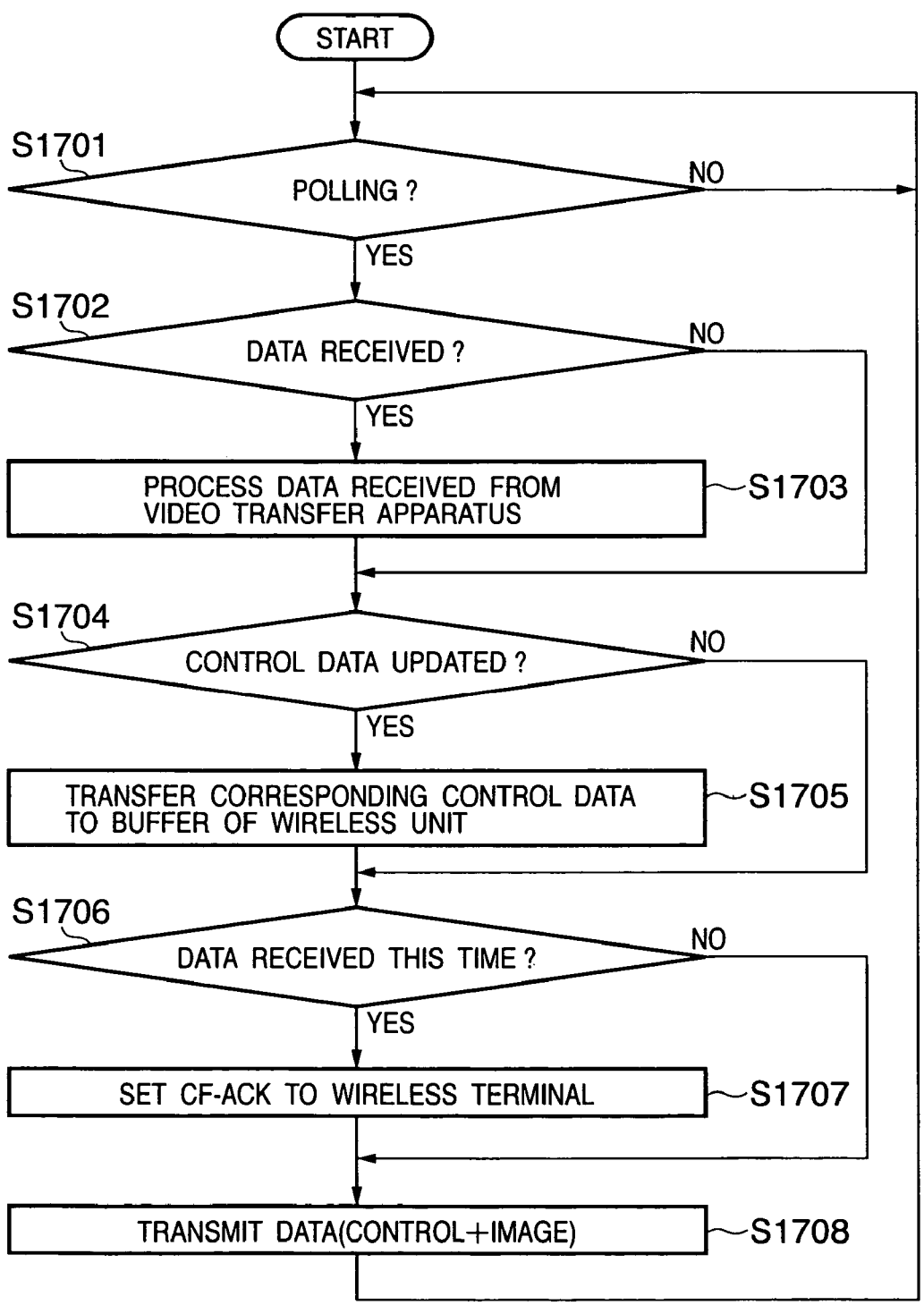
FIG. 17 is a flowchart showing the flow of processing of the wireless video transmission apparatus according to the second embodiment of the present invention.

The operation of the wireless video transmission system according to the second embodiment of the present invention will be described next in detail. FIGS. 11 and 13 are sequence charts showing the flow of processing of the wireless video transmission system according to this embodiment. FIGS. 14 and 15 are flowcharts showing the flow of processing of the wireless terminal 101 according to this embodiment. FIGS. 16 and 17 are flowcharts showing the flow of processing of the wireless video transmission apparatuses 102 and 103 according to this embodiment.

Referring to FIG. 11, the wireless terminal 101 is activated in the area and transmits a beacon signal (M1101) simultaneously with the activation of the apparatus. The wireless video transmission apparatus 2 (102) is activated by power-ON operation and detects the beacon signal (M1101) to search for a wireless terminal having an access point function in the area. Upon detecting the beacon signal (M1101) (YES in step S1601 in FIG. 16 or 13 in Serial Number: 008620-01, Japanese Patent Application No. 2004-319495 filed Nov. 2, 2004), the wireless video transmission apparatus 2 (102) transmits a probe request message (M1102) to the area by broadcast in the asynchronous transmission period (CP), as indicated by 1203 in FIG. 12, and activates the transmission timer (step S1602). Upon receiving the probe request message (M1102) (YES in step S1401 in FIG. 14), the wireless terminal 101 transmits a probe response message (M1103) to the wireless video transmission apparatus 2 (102) by unicast (step S1402).

If the probe response message (M1103) cannot be received (NO in step S1603), the wireless video transmission apparatus 2 (102) checks whether the timer indicates time-out. Before time-out (NO in step S1604), the wireless video transmission apparatus 2 (102) is set in a state to wait for the probe response message (M1103) from the wireless terminal 101 again (step S1603). Upon time-out (YES in step S1604), the wireless video transmission apparatus 2 (102) is set in a state to detect a new beacon signal and repeats the processing of searching for a wireless terminal having an access point function in the area (step S1601).

Upon receiving the probe response message (M1103) (YES in step S1603), the wireless video transmission apparatus 2 (102) executes authentication sequence processing (M1104) for the wireless terminal 101 (step S1605). Upon receiving a wireless authentication request (YES in step S1403), a central control unit 201 of the wireless terminal 101 executes authentication sequence processing (M1104) with the wireless video transmission apparatus 2 (102) and subsequently activates association processing (step S1404). When the authentication sequence processing (M1104) is ended (YES in step S1606), the wireless video transmission apparatus 2 (102) executes association processing (M1105) with the wireless terminal 101 (step S1607). When association processing (M1105) is ended (YES in step S1405), the wireless terminal 101 registers the wireless video transmission apparatus 2 (102) in an entry number 1 (2301) of the connection terminal polling list shown in FIG. 23, saves a wireless video transmission apparatus name 2302 and MAC address 2303 (step S1408), and is set in a communication state.

If association processing (M1105) with the wireless video transmission apparatus 2 (102) cannot be ended, the central control unit 201 of the wireless terminal 101 checks whether the timer indicates time-out. Before time-out, the wireless terminal 101 is set again in a state to wait for the end (step S1405) of association processing (M1105). Upon time-out, the central control unit 201 of the wireless terminal 101 ends connection processing of the wireless video transmission apparatus 2 (102) (step S1407).

When the wireless terminal 101 executes processing shown in FIG. 14, and the wireless video transmission apparatus 1 (103) executes processing shown in FIG. 16, the wireless terminal 101 is set in a communication state with the wireless video transmission apparatus 1 (103) (M1107 to M1111) or ends connection processing of the wireless video transmission apparatus 1 (103) (M1107 to M1110).

From then, the wireless video transmission system shown in FIG. 10 is formed. At this time, the mouse cursor 1001 on the screen of the wireless video transmission apparatus 2 (102) and the mouse cursor 1002 on the screen of the wireless video transmission apparatus 1 (103) in FIG. 10 are used by user operation using a remote controller provided in each wireless video transmission apparatus.

Mouse cursor information is control data such as position information generated in the wireless video transmission apparatus. When a plurality of wireless video transmission apparatuses are used, control data is reflected on the control window 1011 corresponding to the wireless video transmission apparatus 1 and the control window 1012 corresponding to the wireless video transmission apparatus 2 on the liquid crystal screen of the wireless terminal 101.

Image data 1 (e.g., a table of contents) of an application activated on the control window 1011 is rasterized on a video memory 1 (VM1) 208, and image data 2 (e.g., a presentation material) of an application activated on the control window 1012 is rasterized on a video memory 2 (VM2) 209. To transmit the image data 1 to the wireless video transmission apparatus 1 (103), the wireless terminal 101 transfers the image data 1 rasterized on the VM1 to the transmission buffer of a wireless interface unit 203 through a data bus 202 and transmits the image data 1 to the wireless video transmission apparatus 1 (103).

Similarly, to transmit the image data 2 to the wireless video transmission apparatus 2 (102), the wireless terminal 101 transfers the image data 2 rasterized on the VM2 to the transmission buffer of the wireless interface unit 203 through the data bus 202 and transmits the image data 2 to the wireless video transmission apparatus 2 (102).

Transmission processing of control data containing the mouse cursors 1001 and 1002 are executed by using the band-reserved transmission period (CFP) 1202 because they must be transmitted without delay to the wireless terminal 101 and uniformly independently of the number of connected wireless video transmission apparatuses.

Figure 15:
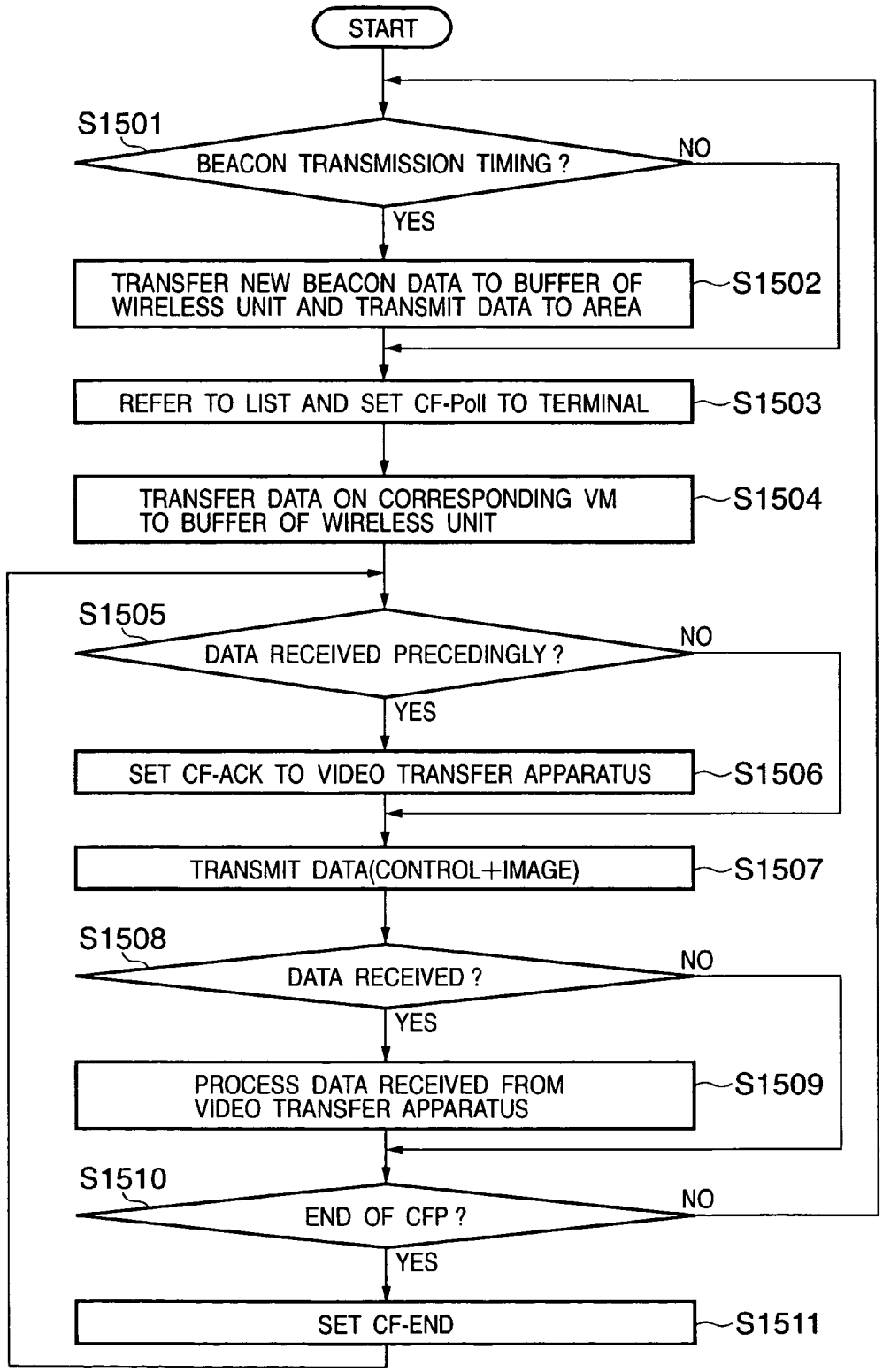
FIG. 15 is a flowchart showing the flow of processing of the wireless terminal according to the second embodiment of the present invention.

Data transmission processing using the band-reserved transmission period (CFP) 1202 will be described below in detail with reference to FIGS. 13, 15, and 17.

The central control unit 201 detects the transmission timing of beacon information (M1300) to generate the transmission frame period. At the transmission timing (YES in step S1501), newly generated beacon information (M1300) is transferred to the transmission buffer of the wireless interface unit 203 and transmitted to the area (step S1502).

If the transmission timing of the beacon information (M1300) is not detected (NO in step S1501), the central control unit 201 skips processing in step S1502 and refers to a terminal which has entered the connection terminal polling list shown in FIG. 23. As a result of referring to the entry number 2301, a polling reservation (CF-Poll) is set in the transmission data frame of the wireless video transmission apparatus 2 (102) with the entry number 1, which should be transmitted by using a polling request message using the band-reserved transmission period (CFP) 1202 (step S1503). To transmit the image data rasterized on the video memory 2 (VM2) 209 to the wireless video transmission apparatus 2 (102), the central control unit 201 transfers the image data to the transmission buffer of the wireless interface unit 203 through the data bus 202 (step S1504).

Subsequently, the central control unit 201 checks whether the wireless terminal 101 has precedingly received control data or the like from the wireless video transmission apparatus in the band-reserved transmission period (CFP) 1202. If data has been received (YES in step S1505), a reception confirmation (CF-ACK) is set in the transmission data frame of the wireless video transmission apparatus 2 (102) (step S1506). The transmission data (data 1+CF-ACK+CF-Poll) frame (M1301) is transmitted to the wireless video transmission apparatus 2 (102) (step S1507). If data has not been received (NO in step S1505), the wireless terminal 101 skips processing in step S1506 and transmits the transmission data (data 1+CF-Poll) frame (M1301) to the wireless video transmission apparatus 2 (102) (step S1507).

Upon receiving the transmission data frame (M1301) from the wireless terminal 101, the wireless video transmission apparatus 2 (102) analyzes the transmission data frame (M1301).

If polling is present (YES in step S1701), the wireless video transmission apparatus 2 (102) detects the presence/absence of data reception. If data is received (YES in step S1702), the image data 1 (e.g., a presentation material) is extracted from the data area of the transmission data and projected on the screen by using the image output function of the wireless video transmission apparatus 2 (102) (step S1703). If no data is received (NO in step S1702), the wireless video transmission apparatus 2 (102) skips processing in step S1703 and checks whether the control data such as position information of the mouse cursor 1001 on the screen of the wireless video transmission apparatus 2 (102) is updated.

If the control data is updated (YES in step S1704), the control data such as position information is transferred to the transmission buffer in the wireless interface unit (step S1705). If the control data is not updated (NO in step S1704), the wireless video transmission apparatus 2 (102) skips processing in step S1705 and checks whether image data is received from the wireless terminal 101 in the band-reserved transmission period (CFP) 1202. If image data is received (YES in step S1706), a reception confirmation (CF-ACK) is set in the transmission data frame to the wireless terminal 101 (step S1707). The transmission data (data 2+CF-ACK) frame (M1302) is transmitted to the wireless terminal 101 (step S1708). If no image data is received (NO in step S1706), processing in step S1707 is skipped, and the transmission data (data 2) frame (M1302) is transmitted to the wireless terminal 101 (step S1708). From then, the wireless video transmission apparatus 2 (102) repeats steps S1701 to S1708.

Upon receiving the transmission data frame (M1302) from the wireless video transmission apparatus 2 (102), the wireless terminal 101 detects the presence/absence of data reception. If data is received (YES in step S1508), the control data (e.g., position information of the mouse cursor) is extracted from the data area of the transmission data. The control data (e.g., position information of the mouse cursor) is reflected on the control screen 1012 corresponding to the wireless video transmission apparatus 2 (102) (step S1509).

If no data is received from the wireless video transmission apparatus 2 (102) (NO in step S1508), the central control unit 201 skips processing in step S1509 and checks the end of the band-reserved transmission period (CFP) 1202. If the band-reserved transmission period (CFP) 1202 is not ended (NO in step S1510), beacon information (M1300) transmission confirmation processing (step S1501) is started to prepare for the next data transmission.

The central control unit 201 detects the transmission timing of beacon information (M1300) to generate the transmission frame period. At the transmission timing (YES in step S1501), the wireless terminal 101 transmits newly generated beacon information (M1300) to the transmission buffer of the wireless interface unit 203 and transmits the beacon information to the area (step S1502).

If the transmission timing of the beacon information (M1300) is not detected (NO in step S1501), processing in step S1502 is skipped. A wireless video transmission apparatus which has entered the connection terminal polling list shown in FIG. 23 and is different from the wireless video transmission apparatus 2 (102) is referred to.

As a result of referring to the entry number 2301, a polling reservation (CF-Poll) is set in the transmission data frame of the wireless video transmission apparatus 1 (103) with the entry number 2, which should be transmitted by using a polling request message using the band-reserved transmission period (CFP) 1202 (step S1503). To transmit the image data rasterized on the video memory 1 (VM1) 208 to the wireless video transmission apparatus 1 (103), the image data is transferred to the transmission buffer of the wireless interface unit 203 through the data bus 202 (step S1504).

Subsequently, it is checked whether the wireless terminal 101 has precedingly received control data or the like from the wireless video transmission apparatus in the band-reserved transmission period (CFP) 1202. If data has been received (YES in step S1505), a reception confirmation (CF-ACK) is set in the transmission data frame of the wireless video transmission apparatus 1 (103) (step S1506). The transmission data (data 3+CF-ACK+CF-Poll) frame (M1303) is transmitted to the wireless-video transmission apparatus 1 (103) (step S1507). If data has not been received (NO in step S1505), processing in step S1506 is skipped, and the transmission data (data 3+CF-Poll) frame (M1303) is transmitted to the wireless video transmission apparatus 1 (103) (step S1507).

Upon receiving the transmission data frame (M1303) from the wireless terminal 101, the wireless video transmission apparatus 1 (103) analyzes the transmission data frame (M1303).

If polling is present (YES in step S1701), the presence/absence of data reception is detected. If data is received (YES in step S1702), the image data 1 (e.g., a table of contents) is extracted from the data area of the transmission data and projected on the screen by using the image output function of the wireless video transmission apparatus 1 (103) (step S1703). If no data is received (NO in step S1702), the wireless video transmission apparatus 1 (103) skips processing in step S1703 and checks whether the control data such as position information of the mouse cursor 1002 on the screen of the wireless video transmission apparatus 1 (103) is updated.

If the control data is updated (YES in step S1704), the control data such as position information is transferred to the transmission buffer in the wireless interface unit (step S1705). If the control data is not updated (NO in step S1704), the wireless video transmission apparatus 1 (103) skips processing in step S1705 and checks whether image data is received from the wireless terminal 101 in the band-reserved transmission period (CFP) 1202. If image data is received (YES in step S1706), a reception confirmation (CF-ACK) is set in the transmission data frame to the wireless terminal 101 (step S1707). The transmission data (data 4+CF-ACK) frame (M1304) is transmitted to the wireless terminal 101 (step S1708). If no image data is received (NO in step S1706), processing in step S1707 is skipped, and the transmission data (data 4) frame (M1304) is transmitted to the wireless terminal 101 (step S1708).

From then, the wireless video transmission apparatus 1 (103) repeats steps S1701 to S1708.

Upon receiving the transmission data frame (M1304) from the wireless video transmission apparatus 1 (103), the wireless terminal 101 detects the presence/absence of data reception. If data is received (YES in step S1508), the control data (e.g., position information of the mouse cursor) is extracted from the data area of the transmission data. The control data (e.g., position information of the mouse cursor) is reflected on the control screen 1011 corresponding to the wireless video transmission apparatus 1 (103) (step S1509).

If no data is received from the wireless video transmission apparatus 1 (103) (NO in step S1508), the wireless terminal 101 skips processing in step S1509 and checks the end of the band-reserved transmission period (CFP) 1202. If the band-reserved transmission period (CFP) 1202 is not ended (NO in step S1510), beacon information (M1300) transmission confirmation processing (step S1501) is started to prepare for the next data transmission.

As described above, the wireless video transmission apparatus 1 (103) and wireless video transmission apparatus 2 (102) repeatedly execute the processing shown in FIG. 17. The wireless terminal 101 repeatedly executes steps S1501 to S1510 in FIG. 15. With this operation, updated control data transmission/reception is done between the wireless video transmission apparatus 1 (103) and the wireless terminal 101 and between the wireless video transmission apparatus 2 (102) and the wireless terminal 101 (M1305 and M1306, and M1307 and M1308).

When the CFP is ended (YES in step S1510), the wireless terminal 101 sets a CFP end (CF-END) in the transmission data frame of the wireless video transmission apparatus 2 (102). (step S1511). By executing steps S1505 to S1511, the transmission data (CF-END+CF-ACK) frame (M1309) is transmitted to the area as a network formed by the wireless terminal 101, wireless video transmission apparatus 2 (102), and wireless video transmission apparatus 1 (103). From then, in the network, the data transmission period 1204 changes to the asynchronous transmission period (CP) 1203 for a predetermined time. If the CFP is not ended (NO in step S1510), the wireless terminal 101 starts beacon information (M1300) transmission confirmation processing (step S1501) to prepare for the next data transmission.

From then, the wireless terminal 101 repeats steps S1501 to S1511 for the connected wireless video transmission apparatus. As a result, the control data such as the mouse cursor is continuously reflected on the control window 1011 corresponding to the wireless video transmission apparatus 1 and the control window 1012 corresponding to the wireless video transmission apparatus 2 on the liquid crystal screen of the wireless terminal 101.

Third Embodiment

A wireless video transmission system according to the third embodiment of the present invention will be described next with reference to FIGS. 2, 3, 10, and 20 to 22. Even in this embodiment, procedures for establishing a communication network shown in FIG. 19 and the like are executed, as in the first embodiment. A wireless terminal 101 switches the application to rasterize image data between a VM1 and VM2, as in the first embodiment, by the established communication network. The rasterized image data can be transmitted to a wireless video transmission apparatus 1 (103) and wireless video transmission apparatus 2 (102). A description of these procedures will be omitted here for the sake of simplicity.

Figure 20:
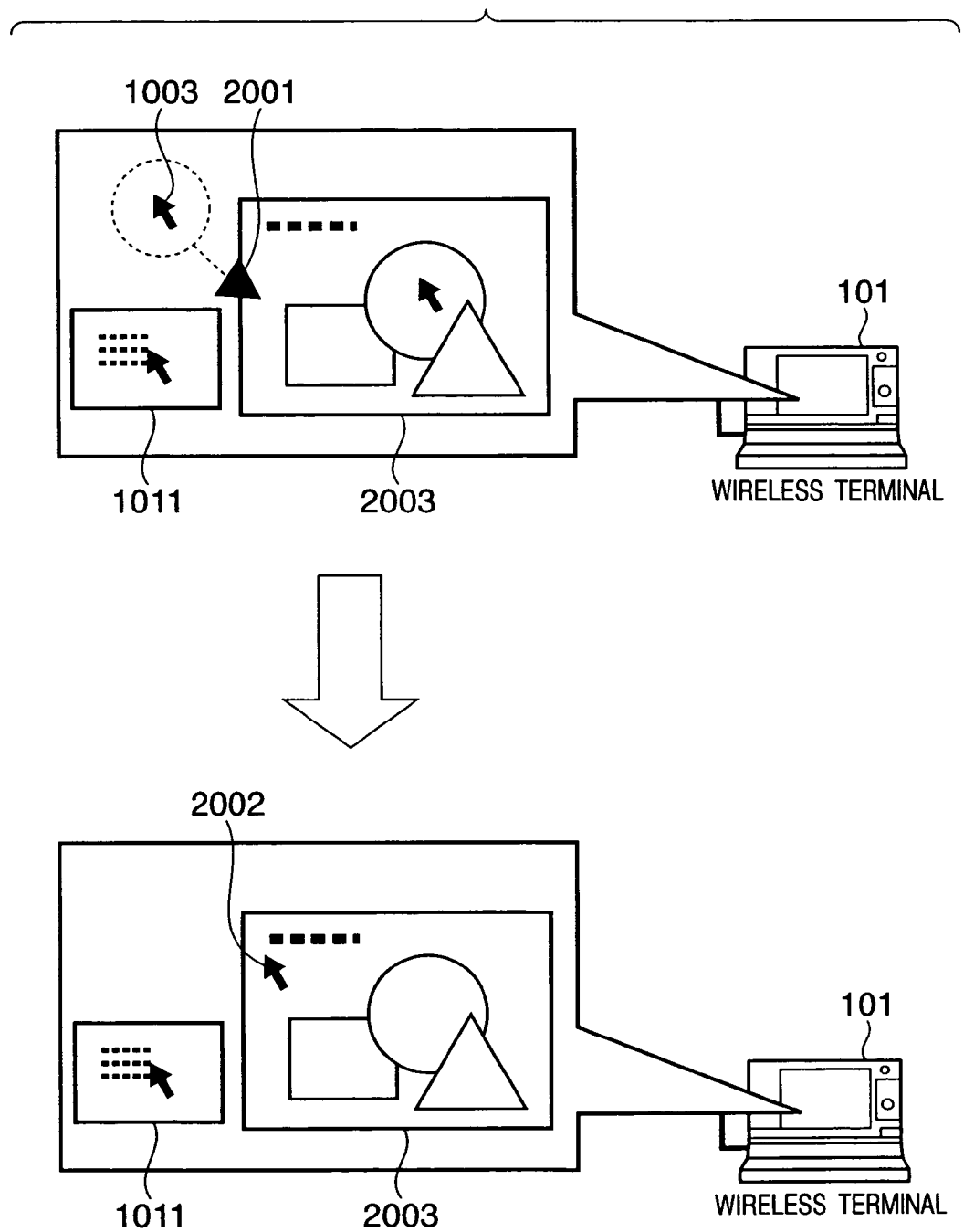
FIG. 20 is a view for explaining mouse cursor control processing according to the third embodiment of the present invention.

FIG. 20 is a view for explaining mouse cursor moving processing according to this embodiment. Reference numeral 2001 denotes movement of a mouse cursor into a control window 2003 of the wireless video transmission apparatus 2 (102) in the wireless terminal 101; and 2002, a mouse cursor moved to the control window 2003 of the wireless video transmission apparatus 2 (102).

Figure 21:
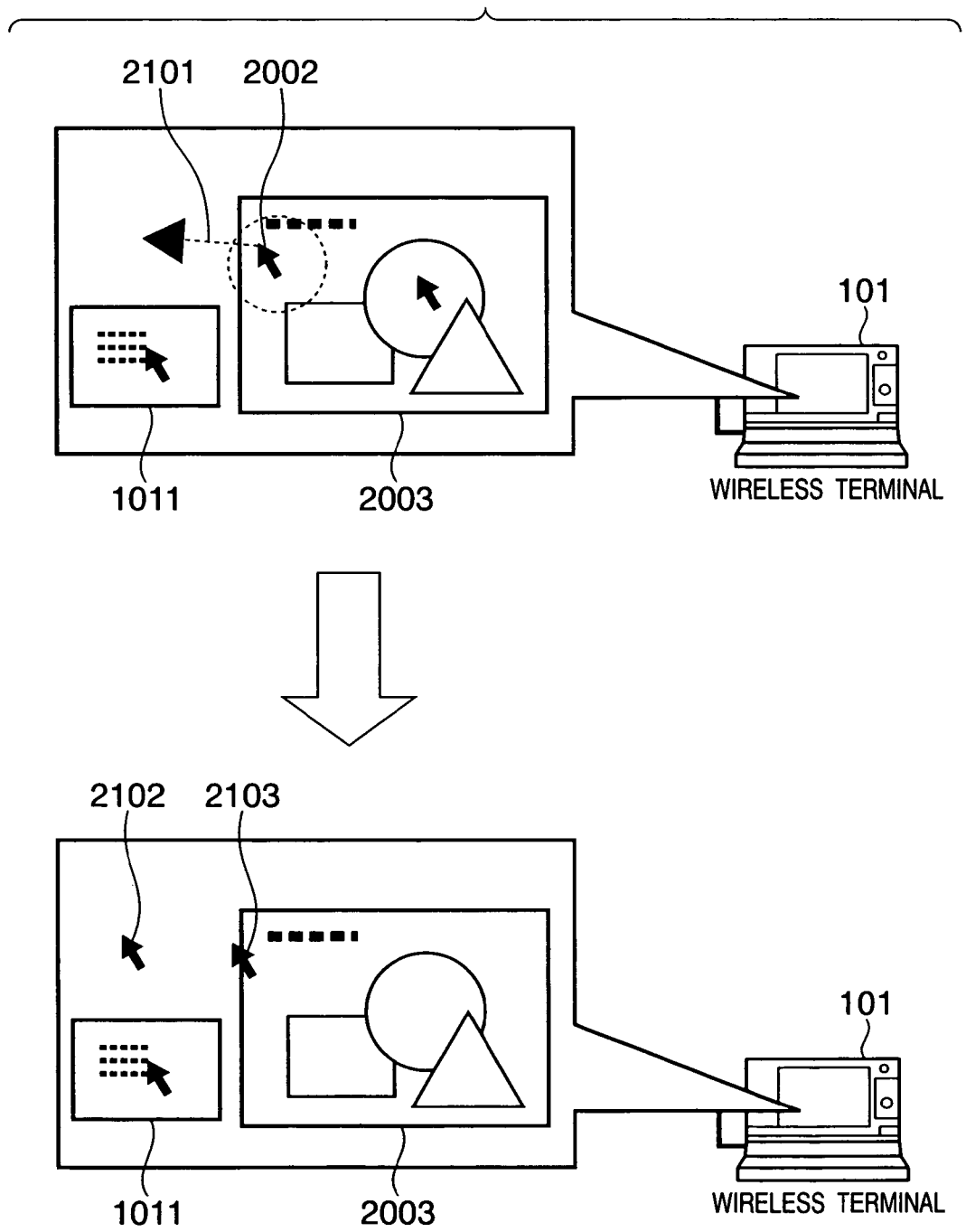
FIG. 21 is a view for explaining mouse cursor control processing according to the third embodiment of the present invention.

FIG. 21 is a view for explaining another mouse cursor control processing according to this embodiment. Reference numeral 2101 denotes movement of the mouse cursor from the control window 2003 of the wireless video transmission apparatus 2 (102); 2102, a mouse cursor whose control right is moved to the wireless terminal 101 by movement; and 2103, a mouse cursor whose control right is moved to the wireless video transmission apparatus 2 (102) by movement.

Figure 22:
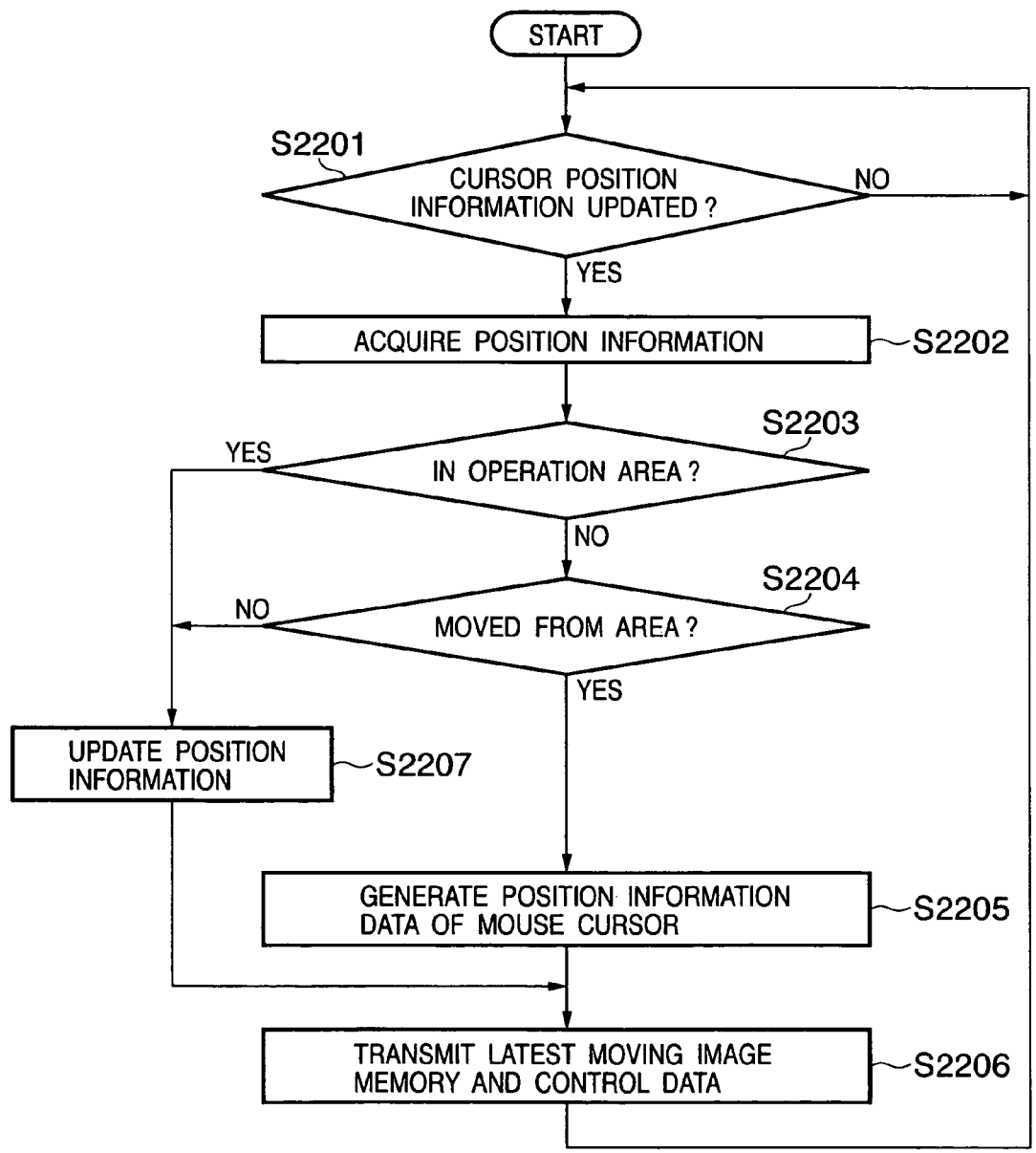
FIG. 22 is a flowchart showing the flow of processing of a wireless terminal according to the third embodiment of the present invention.

FIG. 22 is a flowchart showing the flow of processing of the wireless terminal 101 according to this embodiment.

Referring to FIG. 10, a mouse cursor 1001 on the screen of the wireless video transmission apparatus 2 (102) and a mouse cursor 1002 on the screen of the wireless video transmission apparatus 1 (103) are used by user operation using a remote controller provided in each wireless video transmission apparatus. Mouse cursor information is control data such as position information generated in the wireless video transmission apparatus. When a plurality of wireless video transmission apparatuses are to be used, control data is reflected on a control window 1011 corresponding to the wireless video transmission apparatus 1 and a control window 1012 corresponding to the wireless video transmission apparatus 2 on the liquid crystal screen of the wireless terminal 101.

Image data 1 (e.g., a table of contents) of an application activated on the control window 1011 is rasterized on a video memory 1 (VM1) 208, and image data 2 (e.g., a presentation material) of an application activated on the control window 1012 is rasterized on a video memory 2 (VM2) 209. To transmit the image data 1 to the wireless video transmission apparatus 1 (103), the wireless terminal 101 transfers the image data 1 rasterized on the VM1 to the transmission buffer of a wireless interface unit 203 through a data bus 202 and transmits the image data 1 to the wireless video transmission apparatus 1 (103).

Similarly, to transmit the image data 2 to the wireless video transmission apparatus 2 (102), the image data 2 rasterized on the VM2 is transferred to the transmission buffer of the wireless interface unit 203 through the data bus 202 and transmitted to the wireless video transmission apparatus 2 (102). A mouse cursor 1003 outsides the control windows is operated by the user of the wireless terminal 101.

When the mouse cursor 1003 operated by the user of the wireless terminal 101 is moved in FIG. 20 (YES in step S2201), a central control unit 201 acquires position information of the mouse cursor 1003 by an input unit 207 (step S2202).

If it is determined on the basis of the acquired position information that the mouse cursor is moved (2001) to the area of the control window 1012 corresponding to the wireless video transmission apparatus 2 (YES in step S2203), the central control unit 201 stores the position information data in a storage area unit 205 as latest data (step S2207). The central control unit 201 rasterizes the image data 2 (e.g., a presentation material) on the video memory 2 (VM2) 209.

To transmit, to the wireless video transmission apparatus 2 (102), the updated position information of the mouse cursor 2002 on the control window 2003 corresponding to the wireless video transmission apparatus 2 (102), the wireless terminal 101 transmits the position information of the mouse cursor 2002 stored in the storage area unit 205 to the transmission buffer of the wireless interface unit 203.

To transmit the image data 2 rasterized on the VM2 to the wireless video transmission apparatus 2 (102), the image data on the video memory 2 (VM2) 209 is transferred to the transmission buffer of the wireless interface unit 203 through the data bus 202.

The wireless terminal 101 transmits an RTS (Request To Send) message (M305 in FIG. 3) to the wireless video transmission apparatus 2 (102) and starts data transmission processing. Upon receiving the RTS message (M305), the wireless video transmission apparatus 2 (102) returns a CTS (Clear To Send) message (M306) to the wireless terminal 101 if data reception is possible.

Upon receiving the CTS message (M306), the wireless terminal 101 transmits the image data (M307) and control data (containing position information of the mouse cursor 2002) in the transmission buffer of the wireless interface unit 203 to the wireless video transmission apparatus 2 (102) (step S2206). Upon receiving the control data and image data (M307), the wireless video transmission apparatus 2 (102) returns an ACK (Acknowledgement) message (M308) as a reception confirmation to the wireless terminal 101 and projects the image data 2 on the screen. After the position information of the mouse cursor 2002 is updated, the mouse cursor is displayed on the screen.

When the mouse cursor 2002 on the control window 2003 corresponding to the wireless video transmission apparatus 2 (102) is moved by the user of the wireless terminal 101 in FIGS. 21 and 22 (YES in step S2201), the central control unit 201 acquires position information of the mouse cursor 2002 by the input unit 207 (step S2202).

If it is determined on the basis of the acquired position information that the mouse cursor is moved (2101) from the area of the control window 2003 corresponding to the wireless video transmission apparatus 2 (NO in step S2203), the central control unit 201 checks whether the mouse cursor is in the control window 2003 (step S2204). If the mouse cursor is in the control window 2003 (NO in step S2204), the central control unit 201 stores the position information of the mouse cursor 2002 in the storage area unit 205 as latest data (step S2207) and executes the above-described processing in step S2207.

If it is determined by checking the position information of the mouse cursor 2002 that the mouse cursor is outside the control window 2003 (YES in step S2204), the central control unit 201 generates position information data of the mouse cursor 2103 which indicates a predetermined position such as the center of the screen or a point of the mouse cursor coming out from the control window 2003 and stores the data in the storage area unit 205 as latest data (step S2205). The wireless terminal 101 rasterizes the image data 2 (e.g., a presentation material) on the video memory 2 (VM2) 209.

To transmit the image data 2 rasterized on the VM2 to the wireless video transmission apparatus 2 (102), the wireless terminal 101 transfers the image data on the video memory 2 (VM2) 209 to the transmission buffer of the wireless interface unit 203 through the data bus 202.

An RTS (Request To Send) message (M305) is transmitted to the wireless video transmission apparatus 2 (102), and data transmission processing is started. Upon receiving the RTS message (M305), the wireless video transmission apparatus 2 (102) returns a CTS (Clear To Send) message (M306) to the wireless terminal 101 if data reception is possible.

Upon receiving the CTS message (M306), the wireless terminal 101 transmits the image data (M307) and control data (containing position information of the mouse cursor 2103) in the transmission buffer of the wireless interface unit 203 to the wireless video transmission apparatus 2 (102) (step S2206). Upon receiving the image data (M307), the wireless video transmission apparatus 2 (102) returns an ACK (Acknowledgement) message (M308) as a reception confirmation to the wireless terminal 101 and projects the image data 2 on the screen. After the received position information of the mouse cursor 2103 is updated, the mouse cursor is displayed on the screen.

The mouse cursor 2102 operated by the user of the wireless terminal 101 is separated from the mouse cursor 2103 and moves to an area on the liquid crystal screen of the wireless terminal 101 except the control window 1011 corresponding to the wireless video transmission apparatus 1 and the control window 2003 corresponding to the wireless video transmission apparatus 2.

Other Embodiment

In the first embodiment of the present invention, in response to a moving image memory switching request, a control window corresponding to a wireless video transmission apparatus to be used is selected at the activation of a new application in consideration of various kinds of conditions. Instead, for example, the icon of an application on the desktop may be dragged onto a desired control window by user operation.

In the third embodiment of the present invention, when a mouse cursor under the control of the wireless terminal 101 is moved outside the control window of an application, arbitrary position information data (e.g., the center of the control window) designated in advance in the control window is stored in the storage area unit 205 as latest data. However, latest updated data representing the final position of the mouse cursor in the control window may be stored in the storage area unit 205.

In the first embodiment of the present invention, when a moving image memory switching request is generated, an image memory corresponding to an optimum wireless video transmission apparatus is selected in consideration of various conditions such as a communication speed. Instead, image data in a first moving image memory designated in advance may be transferred to the temporary moving image memory, data in a second moving image memory designated in advance may be transferred to the first moving image memory, and image display data of a newly activated application may be transferred to the second moving image memory.

In the above-described embodiments, a method of flexibly switching moving image data between a wireless terminal and a plurality of wireless video transmission apparatuses in a wireless LAN has been described. However, the present invention is not limited to this. The present invention need not always be applied to a wireless video transmission apparatus such as a video projector which projects image data on a screen and can also be applied to any other peripheral device capable of outputting an image such as a moving image independently of whether the system handles an analog or digital signal. In addition, various changes and modifications can be made without departing from the spirit and scope of the present invention.

As described above, according to the above-described embodiments, in a wireless video transmission system including a plurality of wireless video transmission apparatuses and at least one wireless terminal, switching control of detailed display contents of image data, which change between the plurality of wireless video transmission apparatuses, is implemented in the wireless terminal. Hence, an optimum apparatus can be selected from the wireless video transmission apparatuses with different resolutions in accordance with the characteristic feature and type of the material to be displayed. In communication (e.g., a moving image) which requires a band, a plurality of communication systems can be determined, and an optimum wireless video transmission apparatus can be selected. Furthermore, since the plurality of video cards or hardware resources are unnecessary, the cost of the device can be reduced.

Centralized control is executed for wireless communication with the plurality of wireless terminals by using CFP (contention free period) of the infrastructure mode. For this reason, control data such as a mouse cursor related to display, which is generated continuously in the plurality of wireless video transmission apparatuses, can be reflected on the display screen of the PC without delay.

Since switching control of detailed display contents of image data, which change between the plurality of wireless video transmission apparatuses, is implemented in the wireless terminal, effective presentation can be implemented without forcing the existing wireless video transmission apparatus side to largely change/add/modify hardware or software.

According to the present invention, in response to activation of a new application, an external apparatus as the transmission destination of data generated by the application is automatically selected. On the basis of the selection result, the data rasterizing destination is switched between a plurality of memories corresponding to the external apparatuses. Hence, it is possible to save time and eliminate trouble for a user in selecting, as the data transmission destination, one of the plurality of external apparatuses such as wireless video transmission apparatuses.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-319495 filed on Nov. 2, 2004, which is hereby incorporated by reference herein.

What is claimed is:

1. An information processing apparatus which is connected to a plurality of external apparatuses through a communication network, comprising:
   an application controller which activates a plurality of applications;
   a plurality of memories which are provided in correspondence with the plurality of external apparatuses and on which data generated by the plurality of applications are rasterized;
   a transmitting unit which transmits the data rasterized on said plurality of memories to the corresponding external apparatuses;
   a temporary memory to temporarily save data rasterized on one of said plurality of memories;
   a selector which, when a new application different from the applications whose data are already rasterized on said plurality of memories is activated by said application controller, selects an external apparatus as a transmission destination of data generated by the new application from the plurality of external apparatuses;
   a first transferring unit which transfers, to said temporary memory, one of data rasterized on a first memory as one of said plurality of memories, which corresponds to the external apparatus selected by said selector, and data rasterized on a second memory as one of said plurality of memories, which is different from the first memory;
   a second transferring unit which transfers, to the second memory, the data rasterized on the first memory when the data rasterized on the second memory is transferred to said temporary memory; and
   a third transferring unit which transfers the data generated by the new application to the first memory.

2. The apparatus according to claim 1, wherein said selector selects the external apparatus which uses an optimum communication protocol for transmitting the data generated by the new application.

3. The apparatus according to claim 1, wherein said selector selects, from the plurality of external apparatuses, the external apparatus capable of displaying the data generated by the new application at optimum display performance for displaying the data.

4. The apparatus according to claim 1, further comprising a managing unit which stores communication protocol types of the plurality of external apparatuses and image display resolutions of the plurality of external apparatuses in a managing table after communication connection of the plurality of external apparatuses,
   wherein said selector selects the external apparatus as the transmission destination of the data generated by the new application on the basis of the information stored in the managing table.

5. The apparatus according to claim 1, further comprising:
   a determination unit which determines whether to transfer the data rasterized on the second memory to the first memory when the first memory is freed in accordance with an end of processing by the new application;
   a fourth transferring unit which transfers the data rasterized on the second memory to the first memory on the basis of a determination result by said determination unit; and
   a fifth transferring unit which transfers the data rasterized on said temporary memory to one of the first memory and the second memory on the basis of the determination result by said determination unit.

6. The apparatus according to claim 5, wherein said determination unit determines to transfer the data rasterized on the second memory to the first memory when the external apparatus corresponding to the first memory uses an optimum communication protocol for transferring the data rasterized on the second memory.

7. The apparatus according to claim 5, wherein said determination unit determines to transfer the data rasterized on the second memory to the first memory when the external apparatus corresponding to the first memory has optimum display performance for transferring the data rasterized on the second memory.

8. The apparatus according to claim 5, wherein when said fifth transferring unit cannot transfer the data rasterized on said temporary memory to one of the first memory and the second memory in a predetermined time, an application corresponding to the data rasterized on said temporary memory is activated to rasterize the data rasterized on said temporary memory on one of the first memory and the second memory.

9. The apparatus according to claim 1, wherein said transmitting unit transfers the data to the plurality of external apparatuses by using a contention free period as a time period which can be occupied and used by an arbitrary external apparatus on a radio channel shared by the plurality of external apparatuses.

10. The apparatus according to claim 1, further comprising a receiving unit which receives, from the plurality of external apparatuses, control data related to image display on the information processing apparatus by using a contention period as a time period when communication with the plurality of external apparatuses is possible by using predetermined procedures.

11. The apparatus according to claim 10, wherein the control data is position information of a first cursor by a pointing device moved and displayed on a display image by the plurality of external apparatuses.

12. The apparatus according to claim 1, further comprising a display unit which displays a plurality of control windows corresponding to the plurality of external apparatuses,
   wherein said selector selects the external apparatus corresponding to the first memory as the transmission destination of the data generated by the new application when the new application is activated on the control window of the external apparatus corresponding to the first memory.

13. The apparatus according to claim 12, further comprising a detection unit which detects one of the plurality of control windows, which includes, in an internal area, a display position of a second cursor by a pointing device on said display unit,
   wherein said transmitting unit further transmits position information of the second cursor to the external apparatus corresponding to the control window detected by said detection unit.

14. The apparatus according to claim 1, further comprising:
   a display unit which displays control windows corresponding to the plurality of external apparatuses; and
   a detection unit which detects one of the plurality of control windows, which includes, in an internal area, a display position of a second cursor by a pointing device on said display unit,
   wherein said transmitting unit further transmits position information of the second cursor to the external apparatus corresponding to the control window detected by said detection unit.

15. The apparatus according to claim 13, wherein said transmitting unit transmits the position information of the second cursor representing a predetermined position to the external apparatus corresponding to a control window which is not detected by said detection unit.

16. The apparatus according to claim 13, wherein said transmitting unit transmits the position information of the second cursor representing a final position of the second cursor on the control window area to the external apparatus corresponding to a control window which is not detected by said detection unit.

17. The apparatus according to claim 1, wherein said selector selects the external apparatus corresponding to the first memory designated in advance.

18. An information processing method by an information processing apparatus including a plurality of memories which are provided in correspondence with a plurality of external apparatuses and on which data of a plurality of applications are rasterized, and a temporary memory to temporarily save image data rasterized on one of said plurality of memories, and connected to the plurality of external apparatuses through a communication network, comprising:
   a selection step of, when a new application different from the applications whose data are already rasterized on the plurality of memories is activated by an application controller, selecting an external apparatus as a transmission destination of data generated by the new application from the plurality of external apparatuses;
   a first transferring step of transferring, to the temporary memory, one of data rasterized on a first memory as one of the plurality of memories, which corresponds to the external apparatus selected in the selection step, and data rasterized on a second memory as one of the plurality of memories, which is different from the first memory;
   a second transferring step of transferring, to the second memory, the data rasterized on the first memory when the data rasterized on the second memory is transferred to the temporary memory; and
   a third transferring step of transferring the data generated by the new application to the first memory.

* * * * *